(12) United States Patent  (10) Patent No.: US 7,876,524 B2
Minemura  (45) Date of Patent: Jan. 25, 2011

(54) LIBRARY APPARATUS AND TRANSPORTING MECHANISM THEREFOR

(75) Inventor: Tsukasa Minemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 12/068,569

(22) Filed: Feb. 7, 2008

(65) Prior Publication Data

US 2008/0192381 A1  Aug. 14, 2008

(30) Foreign Application Priority Data

Feb. 8, 2007  (JP) .............................. 2007-029846

(51) Int. Cl.
G11B 21/08  (2006.01)
G11B 7/085  (2006.01)
G11B 15/68  (2006.01)
(52) U.S. Cl. ................. 360/92.1; 369/30.45; 369/30.57
(58) Field of Classification Search ................. 720/600, 720/601, 632; 360/92.1, 98.04–98.06; 369/30.38–30.58; 414/266, 277, 281
See application file for complete search history.

(56) References Cited

U.S. PATENT DOCUMENTS 5,062,093 A  10/1991  Christie et al.

FOREIGN PATENT DOCUMENTS

| JP | 1-185868 | 7/1989 |
| JP | 2-195564 | 8/1990 |
| JP | 4-121304 | 4/1992 |
| JP | 4-184757 | 7/1992 |

OTHER PUBLICATIONS

Japanese Office Action issued on Apr. 1, 2009 in corresponding Japanese Patent Application 2007-029846.

*Primary Examiner*—Craig A. Renner
*Assistant Examiner*—Gustavo Polo
(74) *Attorney, Agent, or Firm*—Staas & Halsey LLP

(57) ABSTRACT

When a rotation shaft reaches a first standstill position, a contact piece is received in a first hooked groove. A grasping mechanism unit is forced to enjoy a change in the attitude around the rotation shaft by the rotation angle of 90 degrees. When the rotation shaft further reaches a first terminal position, the grasping mechanism unit is forced to restore the predetermined attitude around the rotation shaft by the rotation angle of 90 degrees. The linear motion of the rotation shaft is in this manner interconnected to the rotational movement of the grasping mechanism unit in a library apparatus. A pulley, a timing belt and an electric motor can be omitted from the driving mechanism for the grasping mechanism unit. This results in a simplified structure. The production cost is thus reduced. The transporting mechanism can have a longer service life.

8 Claims, 14 Drawing Sheets

LIBRARY APPARATUS AND TRANSPORTING MECHANISM THEREFOR

BACKGROUND OF THE INVENTION

1. Field of the Invention

The present invention relates to a library apparatus such as a magnetic tape library apparatus. In particular, the present invention relates to a transporting mechanism employed in a library apparatus. The transporting mechanism includes a rail extending in the horizontal direction, and a grasping mechanism unit, namely a robot hand, related to the rail for relative rotation around a vertical shaft for grasping an object, namely a magnetic tape cartridge.

2. Description of the Prior Art

A magnetic tape library apparatus is well known. The magnetic tape library apparatus includes a pair of storage boxes opposed to each other. Each of the storage boxes includes cells. A magnetic tape cartridge is contained in the individual cell.

A predetermined space in the form of a parallelepiped is defined between the storage boxes. The slots of magnetic tape drives are arranged along the predetermined space. A transporting mechanism is placed within the predetermined space. The transporting mechanism includes a grasping mechanism, namely a robot hand. The robot hand is capable of transporting the magnetic tape cartridges between the cells and the slots of the magnetic tape drives. The robot hand swallows a select one of the magnetic tape cartridges from the slot when the robot hand receives the magnetic tape cartridge.

The robot hand is mounted on a rail. The robot hand is designed to move in the horizontal direction along the rail. The robot hand is in this manner positioned to a specific one of the cells or the slots of the magnetic tape drives. Simultaneously, the robot hand is designed to rotate around the vertical shaft on the rail. The robot hand is in this manner allowed to oppose its own slot to the specific one of the cells or the slots of the magnetic tape drives.

A linear motion mechanism is coupled to the robot hand on the rail for realization of the horizontal movement of the robot hand. A rotation mechanism is coupled to the robot hand for realization of the rotary movement of the robot hand. The rotation mechanism includes a pair of pulleys and a timing belt wound around the pulleys, for example. The linear motion mechanism and the rotation mechanism are individually coupled to the robot hand. The linear motion mechanism and the rotation mechanism are separately controlled. This results in a complicated structure. The production cost correspondingly increases. In addition, the timing belt inevitably suffers from deterioration due to aging.

SUMMARY OF THE INVENTION

It is accordingly an object of the present invention to provide a transporting mechanism for a library apparatus, having a simplified structure and a long service life.

According to a first aspect of the present invention, there is provided a transporting mechanism for a library apparatus, comprising: a rail; a rotation shaft guided on the rail, the rotation shaft movable on a straight movement path in the opposite directions from a reference position to a first terminal position and a second terminal position; a grasping mechanism unit coupled to the rotation shaft for connection to the rail for relative rotation around the longitudinal axis of the rotation shaft, the grasping mechanism unit designed to grasp an object; a contact piece attached to the grasping mechanism unit, the contact piece extending in parallel with the longitudinal axis of the rotation shaft; a cam plate extending within a plane perpendicular to the longitudinal axis of the rotation shaft, the cam plate defining a cam groove for receiving the contact piece; a first driving mechanism designed to drive the contact piece toward the first terminal position around the rotation shaft when the rotation shaft moves from the reference position to the first terminal position; and a second driving mechanism designed to drive the contact piece toward the second terminal position around the rotation shaft when the rotation shaft moves from the reference position to the second terminal position, wherein the cam groove includes: a reference groove receiving the contact piece on a perpendicular line set perpendicular to the straight movement path at the longitudinal axis of the rotation shaft when the rotation shaft is positioned at the reference position; a first hooked groove receiving the contact piece on an extension of the straight movement path extending from the first terminal position when the rotation shaft is positioned at a first standstill position between the reference position and the first terminal position; a second hooked groove receiving the contact piece on an extension of the straight movement path extending from the second terminal position when the rotation shaft is positioned at a second standstill position between the reference position and the second terminal position; a first terminal groove receiving the contact piece on a perpendicular line set perpendicular to the straight movement path when the rotation shaft is positioned at the first terminal position; a second terminal groove receiving the contact piece on a perpendicular line set perpendicular to the straight movement path when the rotation shaft is positioned at the second terminal position; a first guide groove extending from the reference groove to the first hooked groove; a second guide groove extending from the reference groove to the second hooked groove; a third guide groove extending from the first hooked groove to the first terminal groove; and a fourth guide groove extending from the second hooked groove to the second terminal groove, wherein the first guide groove includes: a first guide wall staying outward of a tangent line tangent to a circle, having the center at the longitudinal axis of the rotation shaft and inscribing the contact piece, when the rotation shaft moves from the reference position to the first standstill position, the tangent line extending from the contact piece in the direction of advancement of the contact piece; and a second guide wall staying inward of a tangent line tangent to a circle, having the center at the longitudinal axis of the rotation shaft and circumscribing the contact piece, when the rotation shaft moves from the first standstill position to the reference position, the tangent line extending from the contact piece in the direction of advancement of the contact piece, wherein the second guide groove includes: a third guide wall staying outward of a tangent line tangent to a circle, having the center at the longitudinal axis of the rotation shaft and inscribing the contact piece, when the rotation shaft moves from the reference position to the second standstill position, the tangent line extending from the contact piece in the direction of advancement of the contact piece; and a fourth guide wall staying inward of a tangent line tangent to a circle, having the center at the longitudinal axis of the rotation shaft and circumscribing the contact piece, when the rotation shaft moves from the second standstill position to the reference position, the tangent line extending from the contact piece in the direction of advancement of the contact piece, wherein the third guide groove includes: a fifth guide wall staying outward of a tangent line tangent to a circle, having the center at the longitudinal axis of the rotation shaft and inscribing the contact piece, when the rotation shaft moves from the first standstill position to the first terminal position, the tangent line extending from the contact piece in the direction of advancement of the contact piece; and a sixth guide wall staying inward of a tangent line tangent to a circle, having the center at the longitudinal axis of the rotation shaft and circumscribing the contact piece, when the rotation shaft moves from the first terminal position to the first standstill position, the tangent line extending from the contact piece in the direction of advancement of the contact piece, wherein the fourth guide groove includes: a seventh guide wall staying outward of a tangent line tangent to a circle, having the center at the longitudinal axis of the rotation shaft and inscribing the contact piece, when the rotation shaft moves from the second standstill position to the second terminal position, the tangent line extending from the contact piece in the direction of advancement of the contact piece; and an eighth guide wall staying inward of a tangent line tangent to a circle, having the center at the longitudinal axis of the rotation shaft and circumscribing the contact piece, when the rotation shaft moves from the second terminal position to the second standstill position, the tangent line extending from the contact piece in the direction of advancement of the contact piece.

When the rotation shaft is positioned at the reference position, the transporting mechanism allows the grasping mechanism unit to take a predetermined attitude. When the rotation shaft reaches the first standstill position, the contact piece is received in the first hooked groove. The grasping mechanism unit is thus forced to enjoy a change in the attitude around the rotation shaft by the rotation angle of 90 degrees. When the rotation shaft further reaches the first terminal position, the grasping mechanism unit is allowed to restore the predetermined attitude around the rotation shaft by the rotation angle of 90 degrees. To the contrary, when the rotation shaft reaches the second standstill position, the contact piece is received in the second hooked groove. The grasping mechanism unit is thus forced to enjoy a change in the attitude around the rotation shaft by the rotation angle of 90 degrees in the direction opposite to the aforementioned direction. When the rotation shaft further reaches the second terminal position, the grasping mechanism unit is forced to restore the predetermined attitude around the rotation shaft by the rotation angle of 90 degrees. The linear motion of the rotation shaft is in this manner interconnected to the rotation of the grasping mechanism unit. A pulley, a timing belt and an electric motor can be omitted from the driving mechanism for the grasping mechanism unit. This results in a simplified structure. The production cost is thus reduced. The transporting mechanism can have a longer service life.

The transporting mechanism may allow the first driving mechanism to include: an auxiliary contact piece extending in parallel with the longitudinal axis of the rotation shaft on a straight line extending from the rotation shaft in the direction opposite to a straight line extending from the rotation shaft to the contact piece; and an auxiliary cam plate defined on a straight line extending from the rotation shaft in the direction opposite to a straight line extending from the rotation shaft to the reference groove, the auxiliary cam plate receiving the auxiliary contact piece in parallel with the straight movement path when the rotation shaft moves from the reference position to the first terminal position. The second driving mechanism may include: an auxiliary contact piece extending in parallel with the longitudinal axis of the rotation shaft on a straight line extending from the rotation shaft in the direction opposite to a straight line extending from the rotation shaft to the contact piece; and an auxiliary cam plate defined on a straight line extending from the rotation shaft in the direction opposite to a straight line extending from the rotation shaft to the reference groove, the auxiliary cam plate receiving the auxiliary contact piece in parallel with the straight movement path when the rotation shaft moves from the reference position to the second terminal position.

The transporting mechanism is utilized in a so-called library apparatus. The library apparatus may comprise: a rail; a rotation shaft guided on the rail, the rotation shaft movable on a straight movement path in the opposite directions from a reference position to a first terminal position and a second terminal position; a grasping mechanism unit coupled to the rotation shaft for connection to the rail for relative rotation around the longitudinal axis of the rotation shaft, the grasping mechanism unit designed to grasp an object; a contact piece attached to the grasping mechanism unit, the contact piece extending in parallel with the longitudinal axis of the rotation shaft; a cam plate extending within a plane perpendicular to the longitudinal axis of the rotation shaft, the cam plate defining a cam groove for receiving the contact piece; a first driving mechanism designed to drive the contact piece toward the first terminal position around the rotation shaft when the rotation shaft moves from the reference position to the first terminal position; and a second driving mechanism designed to drive the contact piece toward the second terminal position around the rotation shaft when the rotation shaft moves from the reference position to the second terminal position, wherein the cam groove includes: a reference groove receiving the contact piece on a perpendicular line set perpendicular to the straight movement path at the longitudinal axis of the rotation shaft when the rotation shaft is positioned at the reference position; a first hooked groove receiving the contact piece on an extension of the straight movement path extending from the first terminal position when the rotation shaft is positioned at a first standstill position between the reference position and the first terminal position; a second hooked groove receiving the contact piece on an extension of the straight movement path extending from the second terminal position when the rotation shaft is positioned at a second standstill position between the reference position and the second terminal position; a first terminal groove receiving the contact piece on a perpendicular line set perpendicular to the straight movement path when the rotation shaft is positioned at the first terminal position; a second terminal groove receiving the contact piece on a perpendicular line set perpendicular to the straight movement path when the rotation shaft is positioned at the second terminal position; a first guide groove extending from the reference groove to the first hooked groove; a second guide groove extending from the reference groove to the second hooked groove; a third guide groove extending from the first hooked groove to the first terminal groove; and a fourth guide groove extending from the second hooked groove to the second terminal groove, wherein the first guide groove includes: a first guide wall staying outward of a tangent line tangent to a circle, having the center at the longitudinal axis of the rotation shaft and inscribing the contact piece, when the rotation shaft moves from the reference position to the first standstill position, the tangent line extending from the contact piece in the direction of advancement of the contact piece; and a second guide wall staying inward of a tangent line tangent to a circle, having the center at the longitudinal axis of the rotation shaft and circumscribing the contact piece, when the rotation shaft moves from the first standstill position to the reference position, the tangent line extending from the contact piece in the direction of advancement of the contact piece, wherein the second guide groove includes: a third guide wall staying outward of a tangent line tangent to a circle, having the center at the longitudinal axis of the rotation shaft and inscribing the contact piece, when the rotation shaft moves from the reference position to the second standstill position, the tangent line extending from the contact piece in the direction of advancement of the contact piece; and a fourth guide wall staying inward of a tangent line tangent to a circle, having the center at the longitudinal axis of the rotation shaft and circumscribing the contact piece, when the rotation shaft moves from the second standstill position to the reference position, the tangent line extending from the contact piece in the direction of advancement of the contact piece, wherein the third guide groove includes: a fifth guide wall staying outward of a tangent line tangent to a circle, having the center at the longitudinal axis of the rotation shaft and inscribing the contact piece, when the rotation shaft moves from the first standstill position to the first terminal position, the tangent line extending from the contact piece in the direction of advancement of the contact piece; and a sixth guide wall staying inward of a tangent line tangent to a circle, having the center at the longitudinal axis of the rotation shaft and circumscribing the contact piece, when the rotation shaft moves from the first terminal position to the first standstill position, the tangent line extending from the contact piece in the direction of advancement of the contact piece, wherein the fourth guide groove includes: a seventh guide wall staying outward of a tangent line tangent to a circle, having the center at the longitudinal axis of the rotation shaft and inscribing the contact piece, when the rotation shaft moves from the second standstill position to the second terminal position, the tangent line extending from the contact piece in the direction of advancement of the contact piece; and an eighth guide wall staying inward of a tangent line tangent to a circle, having the center at the longitudinal axis of the rotation shaft and circumscribing the contact piece, when the rotation shaft moves from the second terminal position to the second standstill position, the tangent line extending from the contact piece in the direction of advancement of the contact piece.

According to a second aspect of the present invention, there is provided a transporting mechanism for a library apparatus, comprising: a rail; a rotation shaft guided on the rail for movement from a reference position to a terminal position on a straight movement path; a grasping mechanism unit coupled to the rotation shaft for connection to the rail for relative rotation around the longitudinal axis of the rotation shaft, the grasping mechanism unit designed to grasp an object; a contact piece attached to the grasping mechanism unit, the contact piece extending in parallel with the longitudinal axis of the rotation shaft; a cam plate extending within a plane perpendicular to the longitudinal axis of the rotation shaft, the cam plate defining a cam groove for receiving the contact piece; and a driving mechanism designed to drive the contact piece toward the terminal position around the rotation shaft when the rotation shaft moves from the reference position to the terminal position, wherein the cam groove includes: a reference groove receiving the contact piece on a perpendicular line set perpendicular to the straight movement path at the longitudinal axis of the rotation shaft when the rotation shaft is positioned at the reference position; a hooked groove receiving the contact piece on an extension of the straight movement path extending from the terminal position when the rotation shaft is positioned at a standstill position between the reference position and the terminal position; a terminal groove receiving the contact piece on a perpendicular line set perpendicular to the straight movement path when the rotation shaft is positioned at the terminal position; a first guide groove extending from the reference groove to the hooked groove; and a second guide groove extending from the hooked groove to the terminal groove, wherein the first guide groove includes: a first guide wall stays outward of a tangent line tangent to a circle, having the center at the longitudinal axis of the rotation shaft and inscribing the contact piece, when the rotation shaft moves from the reference position to the standstill position, the tangent line extending from the contact piece in the direction of advancement of the contact piece; and a second guide wall staying inward of a tangent line tangent to a circle, having the center at the longitudinal axis of the rotation shaft and circumscribing the contact piece, when the rotation shaft moves from the standstill position to the reference position, the tangent line extending from, the contact piece in the direction of advancement of the contact piece, wherein the second guide groove includes: a third guide wall staying outward of a tangent line tangent to a circle, having the center at the longitudinal axis of the rotation shaft and inscribing the contact piece, when the rotation shaft moves from the standstill position to the terminal position, the tangent line extending from the contact piece in the direction of advancement of the contact piece; and a fourth guide wall staying inward of a tangent line tangent to a circle, having the center at the longitudinal axis of the rotation shaft and circumscribing the contact piece, when the rotation shaft moves from the terminal position to the standstill position, the tangent line extending from the contact piece in the direction of advancement of the contact piece.

When the rotation shaft is positioned at the reference position, the transporting mechanism allows the grasping mechanism unit to take a predetermined attitude. When the rotation shaft reaches the standstill position, the contact piece is received in the hooked groove. The grasping mechanism unit is thus forced to enjoy a change in the attitude around the rotation shaft by the rotation angle of 90 degrees. When the rotation shaft further reaches the terminal position, the grasping mechanism unit is forced to restore the predetermined attitude around the rotation shaft by the rotation angle of 90 degrees. The linear motion of the rotation shaft is in this manner interconnected to the rotation of the grasping mechanism unit. A pulley, a timing belt and an electric motor can be omitted from the driving mechanism for the grasping mechanism unit. This results in a simplified structure. The production cost is thus reduced. The transporting mechanism can have a longer service life.

The driving mechanism may include: an auxiliary contact piece extending in parallel with the longitudinal axis of the rotation shaft on a straight line extending from the rotation shaft in the direction opposite to a straight line extending from the rotation shaft to the contact piece; and an auxiliary cam plate defined on a straight line extending from the rotation shaft in the direction opposite to a straight line extending from the rotation shaft to the reference groove, the auxiliary cam plate receiving the auxiliary contact piece in parallel with the straight movement path when the rotation shaft moves from the reference position to the terminal position.

According to a third aspect of the present invention, there is provided a transporting mechanism for a library apparatus, comprising: a rail; a rotation shaft guided on the rail for movement from a reference position to a standstill position on a straight movement path; a grasping mechanism unit coupled to the rotation shaft for connection to the rail for relative rotation around the longitudinal axis of the rotation shaft, the grasping mechanism unit designed to grasp an object; a contact piece attached to the grasping mechanism unit, the contact piece extending in parallel with the longitudinal axis of the rotation shaft; a cam plate extending within a plane perpendicular to the longitudinal axis of the rotation shaft, the cam plate defining a cam groove for receiving the contact piece; and a driving mechanism designed to drive the contact piece toward the standstill position around the rotation shaft when the rotation shaft moves from the reference position to the standstill position, wherein the cam groove includes: a reference groove receiving the contact piece on a perpendicular line set perpendicular to the straight movement path at the longitudinal axis of the rotation shaft when the rotation shaft is positioned at the reference position; a terminal groove receiving the contact piece on an extension of the straight movement path extending from the standstill position when the rotation shaft is positioned at the standstill position; and a guide groove extending from the reference groove to the terminal groove, wherein the guide groove includes: a first guide wall stays outward of a tangent line tangent to a circle, having the center at the longitudinal axis of the rotation shaft and inscribing the contact piece, when the rotation shaft moves from the reference position to the standstill position, the tangent line extending from the contact piece in the direction of advancement of the contact piece; and a second guide wall staying inward of a tangent line tangent to a circle, having the center at the longitudinal axis of the rotation shaft and circumscribing the contact piece, when the rotation shaft moves from the standstill position to the reference position, the tangent line extending from the contact piece in the direction of advancement of the contact piece.

When the rotation shaft is positioned at the reference position, the transporting mechanism allows the grasping mechanism unit to take a predetermined attitude. When the rotation shaft reaches the standstill position, the contact piece is received in the terminal groove. The grasping mechanism unit is thus forced to enjoy a change in the attitude around the rotation shaft by the rotation angle of 90 degrees. The linear motion of the rotation shaft is in this manner interconnected to the rotation of the grasping mechanism unit. A pulley, a timing belt and an electric motor can be omitted from the driving mechanism for the grasping mechanism unit. This results in a simplified structure. The production cost is thus reduced. The transporting mechanism can have a longer service life.

The driving mechanism may include: an auxiliary contact piece extending in parallel with the longitudinal axis of the rotation shaft on a straight line extending from the rotation shaft in the direction opposite to a straight line extending from the rotation shaft to the contact piece; and an auxiliary cam plate defined on a straight line extending from the rotation shaft in the direction opposite to a straight line extending from the rotation shaft to the reference groove, the auxiliary cam plate receiving the auxiliary contact piece in parallel with the straight movement path when the rotation shaft moves from the reference position to the standstill position.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
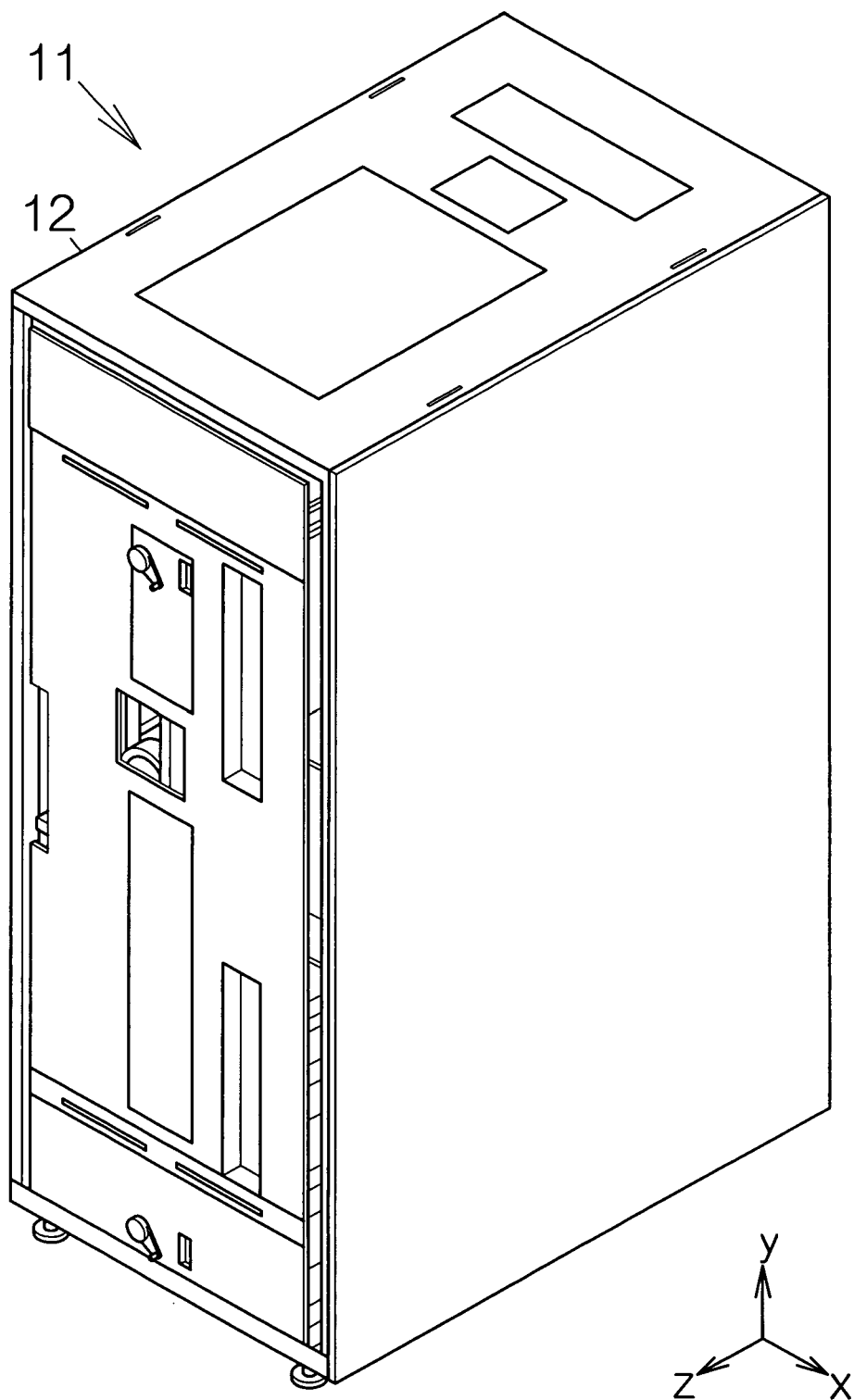
FIG. 1 is a perspective view schematically illustrating a magnetic tape library apparatus.
Figure 2:
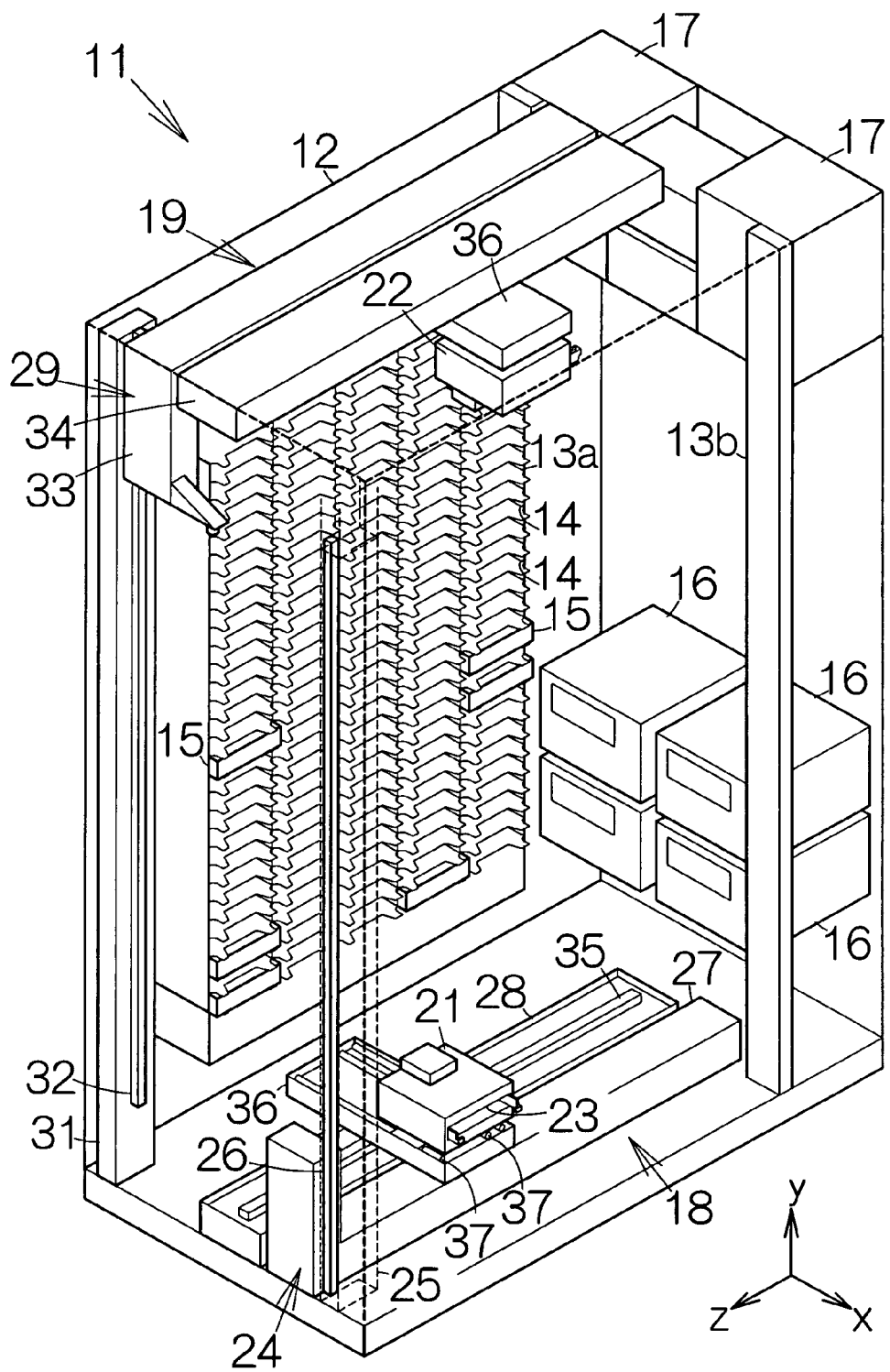
FIG. 2 is a perspective view schematically illustrating the structure of the magnetic tape library apparatus.

FIG. 1 schematically illustrates the structure of a magnetic tape library apparatus 11 according to an embodiment of the present invention. The magnetic tape library apparatus 11 includes a box-shaped enclosure 12. The enclosure 12 defines an inner space in the form of a parallelepiped standing upright from the floor, for example. As shown in FIG. 2, storage boxes 13a, 13b are placed in the inner space of the enclosure 12. A pair of storage boxes 13a, one of them not shown, is located at opposite sides of a predetermined central space in the form of a parallelepiped. Each of the storage boxes 13a includes cells 14, 4, . . . . The openings of the cells 14, 14, . . . are arranged along planes perpendicular to the floor, namely side surfaces of the central space. An object or recording medium such as a magnetic tape cartridge 15 is contained in the individual cell 14. A linear tape-open (LTO) cartridge may be employed as the magnetic tape cartridge 15, for example.

The storage box 13b is placed at a position adjacent to the central space between the storage boxes 13a, 13a. Four, for example, recording medium drives such as magnetic tape drives 16 are placed in the storage box 13b. The magnetic tape drives 16 respectively include slots arranged along a plane perpendicular to the floor, namely a side surface of the central space. The magnetic tape drive 16 is designed to write magnetic information data into a magnetic recording tape inside the magnetic tape cartridge 15. The magnetic tape drive 16 is also designed to read magnetic information data out of the magnetic recording tape inside the magnetic tape cartridge 15. The magnetic tape cartridge 15 is inserted into and withdrawn from the magnetic tape drive 16 through the slot. The magnetic recording tape is unwound from a reel within the magnetic tape cartridge 15 in the magnetic tape drive 16. The unwound magnetic recording tape is then wound around a reel within the magnetic tape drive 16.

Here, an xyz-coordinate system is defined in the central space. The y-axis of the xyz-coordinate system is set perpendicular to the floor. The cells 14 in the storage boxes 13a are arranged in rows in the vertical direction in parallel with the y-axis. The z-axis of the xyz-coordinate system is set to extend in the horizontal direction in parallel with the storage boxes 13a. The z-axis thus extends across the rows of the cells 14 in the storage boxes 13a in the horizontal direction. The x-axis of the xyz-coordinate system is set to extend in the horizontal direction in parallel with the storage box 13b. The x-axis thus extends across the magnetic tape drives 16 in the storage box 13b in the horizontal direction.

Two, for example, containers 17, 17 are placed in the inner space of the enclosure 12. One of the containers 17 contains a library controller board and a first controller board. The other of the containers 17 likewise contains a second controller board. An external host computer, not shown, is connected to the library controller board. Various processings are effected at the library controller board as well as the first and second controller boards based on data and/or instructions supplied from the host computer.

First and second transporting robots 18, 19 as a transporting mechanism are placed in the central space in the enclosure 12. The first and second transporting robots 18, 19 include first and second robot hands 21, 22 as grasping mechanism units, respectively. The first and second robot hands 21, 22 are individually designed to move relative to the first and second storage boxes 13a, 13b. The first and second robot hands 21, 22 are capable of transporting the magnetic tape cartridges 15 between the cells 14 and the magnetic tape drives 16 for read/write operations of the information data. The first and second robot hands 21, 22 are designed to take the magnetic tape cartridge 15 out of the slot of the magnetic tape drive 16 for the transportation. The first and second robot hands 21, 22 are designed to oppose their own slots 23 to the opening of the individual cell 14 for giving and receiving the magnetic tape cartridge 15 to and from the select cell 14. Likewise, the first and second robot hands 21, 22 are allowed to oppose the own slots 23 to the slot of the individual magnetic tape drive 16.

A positioning mechanism 24 is connected to the first robot hand 21 in the first transporting robot 18. The positioning mechanism 24 includes a support member or a first support column 25 standing upright from the floor. A first rail 26 is coupled to the first support column 25. The first rail 26 extends in the vertical direction. A support body or a guide member 27 is coupled to the first rail 26. A first rail base 28 is coupled to the guide member 27. The guide member 27 and the first rail base 28 extend in the horizontal direction in parallel with the storage boxes 13a. The first rail base 28 is positioned at an intermediate position equally spaced from the storage boxes 13a, 13a.

The guide member 27 and the first rail base 28 are allowed to move upward and downward along the first rail 26 in parallel with the y-axis. A driving mechanism is connected to the guide member 27 for the upward and downward movement. The driving mechanism may include a belt coupled to the guide member 27 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example.

Likewise, a positioning mechanism 29 is connected to the second robot hand 22 in the second transporting robot 19. The positioning mechanism 29 includes a support member or a second support column 31 standing upright from the floor. A first rail 32 is coupled to the second support column 31. The first rail 32 extends in the vertical direction. A support body or a guide member 33 is coupled to the first rail 32. A first rail base 34 is coupled to the guide member 33. The guide member 33 and the first rail base 34 extend in the horizontal direction in parallel with the storage boxes 13a. The first rail base 34 is positioned at an intermediate position equally spaced from the storage boxes 13a, 13a.

The guide member 33 and the first rail base 34 are allowed to move upward and downward along the first rail 32 in parallel with the y-axis in the same manner as the guide member 27 and the first rail base 28. A driving mechanism is connected to the guide member 33 for the upward and downward movement. The driving mechanism may include a belt coupled to the guide member 33 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example. The guide members 27, 33 and the first rail bases 28, 34 are arranged in the vertical direction along the y-axis. The first rail base 34 of the second transporting robot 19 moves in the vertical direction above the first rail base 28 of the first transporting robot 18.

A second rail 35 is incorporated within each of the first rail bases 28, 34. The second rail 35 extends in the horizontal direction in parallel with the storage boxes 13a. A second rail base 36 is coupled to the second rail 35. The second rail base 36 extends in the horizontal direction in parallel with the storage box 13b. The second rail base 36 moves in the horizontal direction along the second rail 35 in parallel with the z-axis. A driving mechanism is connected to the second rail base 36 for the horizontal movement. The driving mechanism may include an endless belt wound around a pair of pulleys on the first rail base 28, 34, and a power source establishing a driving force to drive one of the pulleys for rotation, for example. In this case, the endless belt is coupled to the second rail base 36. An electric motor may be utilized as the power source. A stepping motor may be employed as the electric motor, for example. The electric motor is referred to as "z-axis electric motor" hereinafter, for example.

A pair of third rails 37, 37 is incorporated in the individual second rail base 36. The third rails 37, 37b serve as rails according to the present invention. The third rails 37 extend in the horizontal direction in parallel with the storage box 13b. The first and second robot hands 21, 22 are respectively coupled to the corresponding pair of the third rails 37. The first and second robot hands 21, 22 are thus allowed to move in the horizontal direction along the third rails 37 in parallel with the x-axis. The first and second robot hands 21, 22 are also allowed to rotate on the third rails 37 around a rotation axis parallel to a vertical axis or the y-axis. The second rail bases 36 and the robot hands 21, 22 will be described later in detail.

The magnetic tape library apparatus 11 utilizes the coordinates in the xyz-coordinate system and the angle around the rotation axis to identify the position of the individual cell 14. The first and second robot hands 21, 22 in the first and second transporting robots 18, 19 are positioned in accordance with the coordinates of the xyz-coordinate system. The attitude or orientation of the first and second robot hands 21, 22 is determined in accordance with the angle of rotation around the vertical axis. The first controller board determines the position of the first robot hand 21 in accordance with the coordinates set for the individual cell 14. The positioning action generates a change in the attitude of the first robot hand 21 as described later. Likewise, the second controller board determines the position of the second robot hand 22 in accordance with the coordinates set for the individual cell 14. The positioning action generates a change in the attitude of the second robot hand 22. The first and second robot hands 21, 22 are in this manner allowed to oppose the slot 23 to the opening of the select cell 14 with a higher accuracy.

Figure 3:
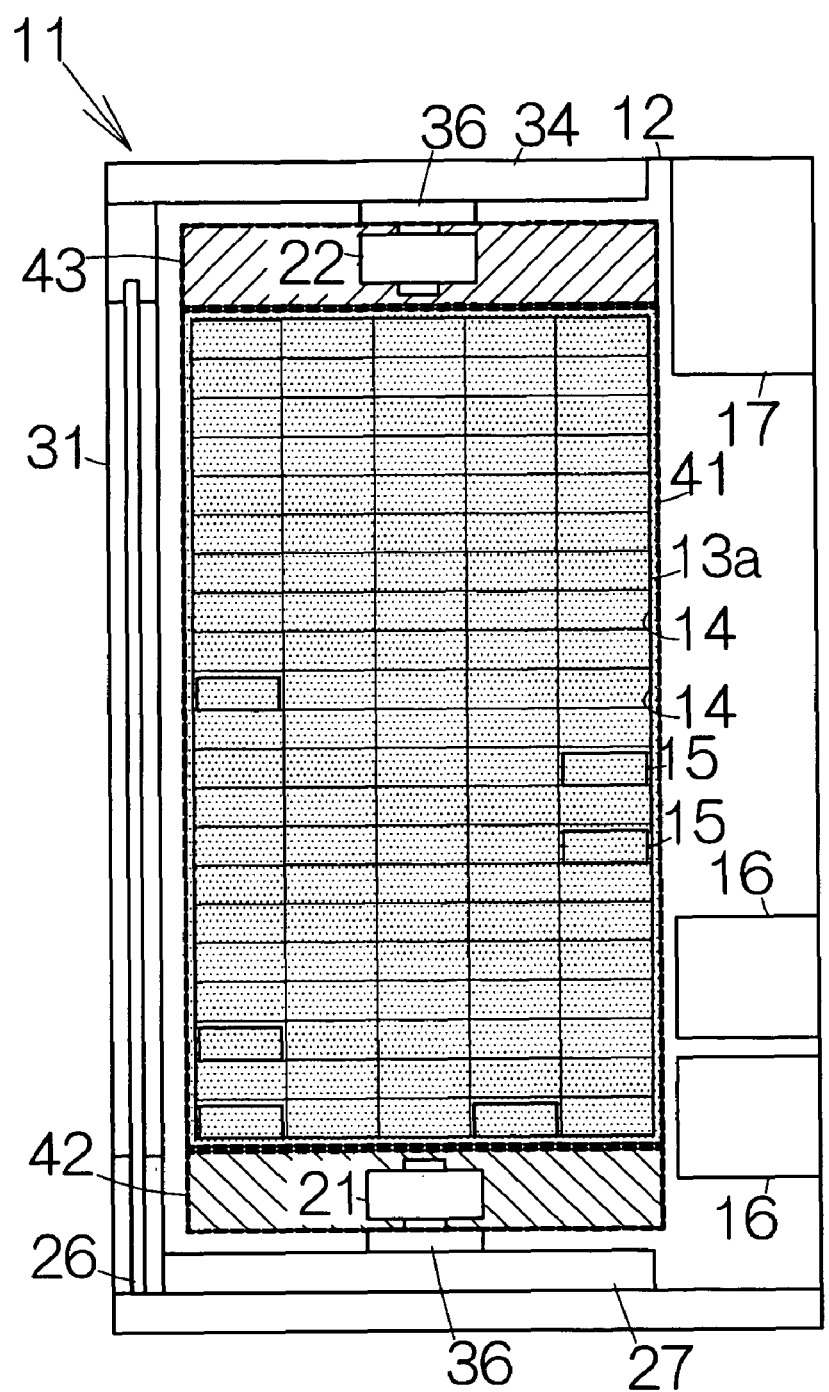
FIG. 3 is a side view of the magnetic tape library apparatus for schematically illustrating the movement regions of first and second robot hands.

As shown in FIG. 3, the first and second robot hands 21, 22 are positioned at positions corresponding or opposed to the cells 14, 14, . . . within an operating region 41. The first or second robot hand 21, 22 is allowed to oppose the slot 23 to a select one of the cells 14, 14, . . . within the operating region 41. Standby regions 42, 43 are provided for the first and second robot hands 21, 22 in the magnetic tape library apparatus 11, respectively. The second robot hand 22 is related to the standby region 43 located adjacent to the upper limit of the operating region 41. In this case, the second transporting robot 19 allows the first rail base 34 to take the highest position on the first rail 32. When the second robot hand 22 is in this manner positioned within the standby position 43, the second robot hand 22 gets out of the operating region 41 so that the first robot hand 21 can be positioned at a position corresponding to any of the cells 14 within the operating region 41. The movement region of the second robot hand 22 thus extends within the operating region 41 and the standby region 43.

Likewise, the first robot hand 21 is related to the standby region 42 located adjacent to the lower limit of the operating region 41. In this case, the first transporting robot 18 allows the first rail base 28 to take the lowest position on the first rail 26. When the first robot hand 21 is in this manner positioned within the standby region 42, the first robot hand 21 gets out of the operating region 41 so that the second robot hand 22 can be positioned at a position corresponding to any of the cells 14 within the operating region 41. The movement region of the first robot hand 21 thus extends within the operating region 41 and the standby region 42. It should be noted that the first and second robot hands 21, 22 may collide against the storage boxes 13a, 13b, when the first and second robot hands 21, 22 takes a specific combination of the coordinates and angle of rotation, since the storage boxes 13a, 13b are located so closer to each other in the magnetic tape library apparatus 11. Such a combination of the coordinates and angle of rotation is excluded from the movement regions of the first and second robot hands 21, 22, respectively.

The magnetic tape library apparatus 11 normally allows the first transporting robot 18 to operate in accordance with instructions from the library controller board. The first robot hand 21 transports the magnetic tape cartridge 15 between the cells 14, 14, . . . and the magnetic tape drives 16, 16, . . . When the first robot hand 21 malfunctions, for example, the library controller board causes the second transporting robot 19 to start operating. The guide member 33 and the first rail base 34 of the second transporting robot 19 are driven downward along the first rail 32. In this case, the first rail base 28 and the guide member 27 of the first transporting robot 18 are disengaged from the driving mechanism on the first rail 26. When the guide member 33 contacts with the guide member 27 of the first transporting robot 18, for example, the driving force of the guide member 33 serves to urge the first rail base 28 and the guide member 27 downward along the first rail 26. When the guide member 33 and the first rail base 34 of the second transporting robot 19 reach the lower limit of the operating region 41, the first rail base 28 of the first transporting robot 18 is positioned at the lower limit of the movement region. The first robot hand 21 is in this manner forced out into the standby region 42. The second robot hand 22 thereafter serves to transfer the magnetic tape cartridge 15 between the cells 14, 14, . . . and the magnetic tape drives 16, 16, . . . in place of the first robot hand 21. As long as the second robot hand 22 moves within the operating region 41, the second transporting robot 19 is reliably prevented from interference with the first transporting robot 18.

Repair can be effected on the first transporting robot 18 during the operation of the second transporting robot 19. The first robot hand 21 may be replaced with a new one in the first transporting robot 18, for example. The new first transporting robot 18 may take the place of the second transporting robot 19 immediately after the replacement of the first robot hand 21. Alternatively, the second transporting robot 19 may be allowed to keep operating even after the replacement of the first robot hand 21. If the second robot hand 22 malfunctions during the operation of the second transporting robot 19, the first transporting robot 18 serves to drive the second robot hand 22 into the standby region 43 in the same manner as described above. The first robot hand 21 then takes the place of the second robot hand 22. As long as the first robot hand 21 moves within the operating region 41, the first transporting robot 18 is reliably prevented from interference with the second transporting robot 19.

Figure 4:
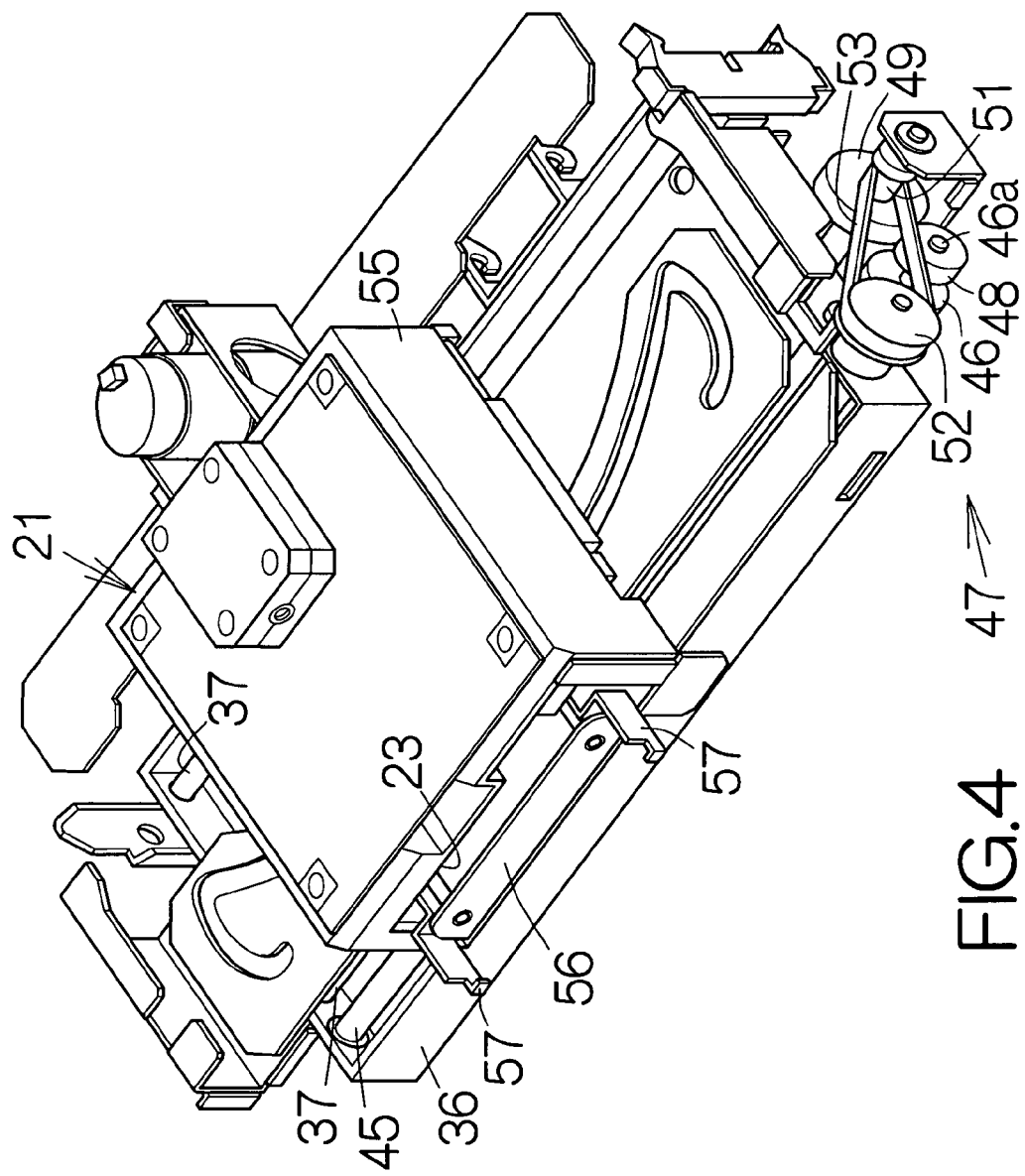
FIG. 4 is an enlarged perspective view schematically illustrating the first robot hand and a second rail base.

As shown in FIG. 4, a screw shaft 45 is mounted on the second rail base 36. The screw shaft 45 extends in parallel with the third rails 37, 37. A power source such as an electric motor 46 is coupled to the screw shaft 45. A stepping motor may be employed as the electric motor 46, for example. The electric motor 46 is referred to as "x-axis electric motor" hereinafter, for example. A predetermined transmission mechanism 47 couples a driving shaft 46a of the x-axis electric motor 46 and the screw shaft 45 to each other. The transmission mechanism 47 includes a pulley unit and a gear unit for a speed reducing mechanism, for example. The gear unit includes a small-sized gear 48 having a small diameter mounted on the driving shaft 46a of the x-axis electric motor 46. A large-sized gear 49 having a large diameter is engaged with the small-sized gear 48. The torque of the x-axis electric motor 46 is transmitted to the large gear 49 through the small gear 48. The large gear 49 is integrally provided with a small-sized pulley 51 of the pulley unit. A large-sized pulley 52 of the pulley unit is mounted on the screw shaft 45. An endless timing belt 53 is wound around the small-sized pulley 51 and the large-sized pulley 52. The torque of the large-sized gear 49 is transmitted to the screw shaft 45 through the small-sized pulley 51 and the large-sized pulley 52.

The first robot hand 21 includes a box-shaped enclosure 55. The aforementioned slot 23 is defined in the front surface of the enclosure 55. A support member 56 is placed in the enclosure 55. The support member 56 is designed to move in the longitudinal direction of the first robot hand 21 between a front position and a rear position along an imaginary plane or a horizontal plane.

A pair of grasping fingers 57 is mounted on the support member 56. A predetermined space is defined between the grasping fingers 57 along the horizontal plane in the lateral direction perpendicular to the longitudinal direction. When the support member 56 reaches the front position, the grasping fingers 57 protrude from the slot 23. The magnetic tape cartridge 15 is allowed to get in/out of the space between the grasping fingers 57. When the support member 56 starts receding from the front position, the grasping fingers 57 gets closer to each other. The magnetic tape cartridge 15 is thus held between the grasping fingers 57. When the support member 56 completely recedes and reaches the rear position, the magnetic tape cartridge 15 is swallowed into the enclosure 55. The magnetic tape cartridge 15 is in this manner enclosed in the enclosure 55. When the support member 56 again moves forward to the front position, the magnetic tape cartridge 15 is received in a select one of the cells 14 or the slot of a select one of the magnetic tape drives 16 from the grasping fingers 57.

Figure 5:
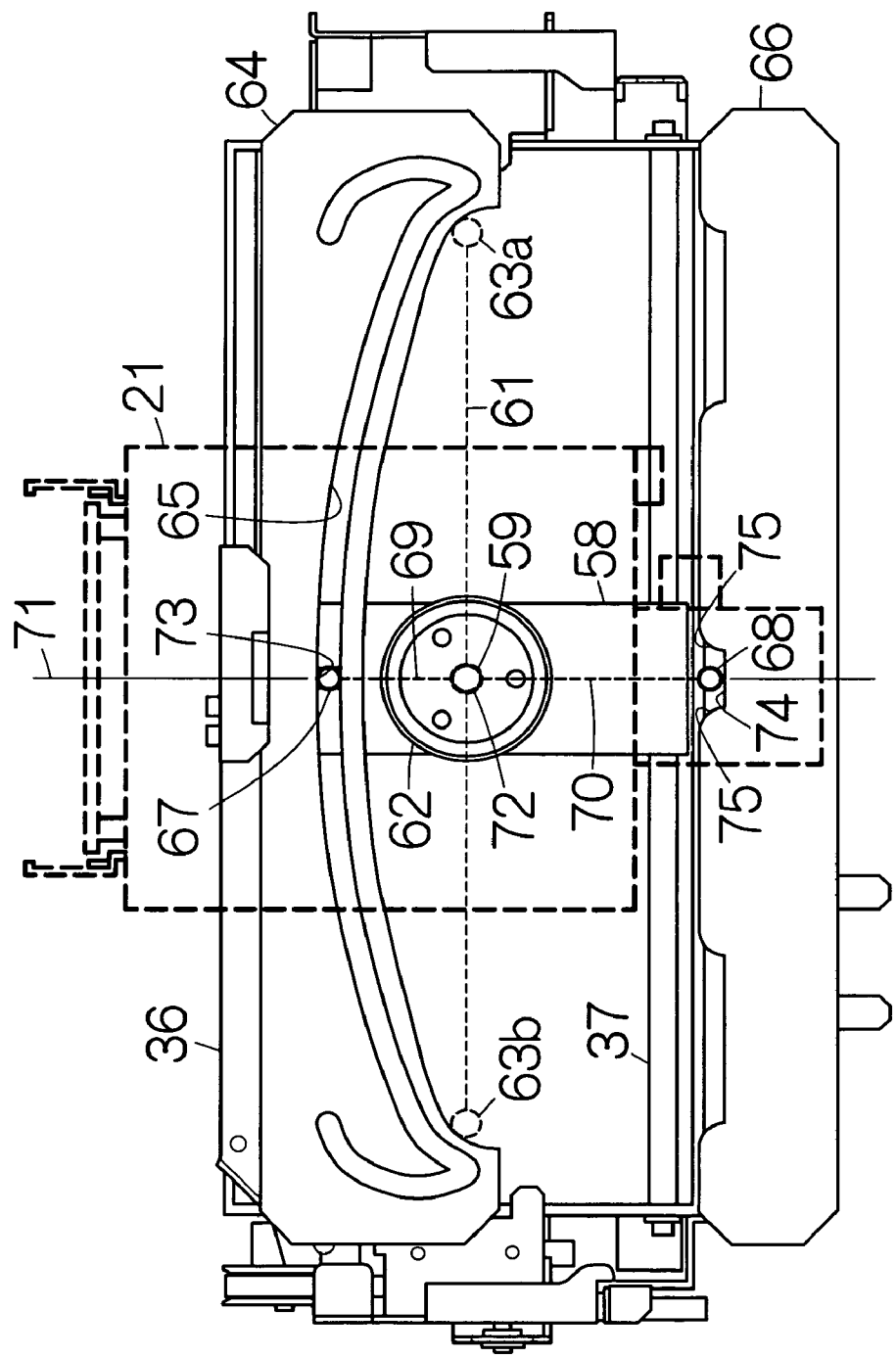
FIG. 5 is a plan view of the second rail base for schematically illustrating the reference position of a rotation shaft.

As shown in FIG. 5, a pedestal 58 is mounted on the second rail base 36. The pedestal 58 is coupled to the third rails 37, 37. The pedestal 58 moves along the third rails 37, 37. A rotation shaft 59 is fixed to the pedestal 58. The rotation shaft 59 extends in the vertical direction. The rotation shaft 59 is allowed to move on a horizontal plane along a straight movement path 61 in this manner.

A rotating member 62 is mounted on the rotation shaft 59 for relative rotation around the longitudinal axis of the rotation shaft 59. The first robot hand 21 is fixed to the rotating member 62. The first robot hand 21 is in this manner related to the third rails 37 for relative rotation around the longitudinal axis of the rotation shaft 59.

The pedestal 58 is engaged with the screw shaft 45. A nut member, not shown, is fixed to the pedestal 58 for the engagement, for example. The rotation of the screw shaft 45 around its longitudinal axis allows the movement of the pedestal 58. The rotation shaft 59 is designed to move between a first terminal position 63a and a second terminal position 63b. The movement of the rotation shaft 59 is restrained between the first and second terminal positions 63a, 63b. The rotation shaft 59 is positioned between the first and second terminal positions 63a, 63b in parallel with the x-axis of the magnetic tape library 11 depending on the rotation angle or amount of the screw shaft 45.

A first cam plate 64 is mounted on the second rail base 36. The first cam plate 64 extends along a plane perpendicular to the rotation shaft 59, namely a horizontal plane. A cam groove 65 is defined in the first cam plate 64. A detailed description will be made on the cam groove 65 later. Likewise, a second cam plate 66 is mounted on the second rail base 36. The second cam plate 66 extends along a plane perpendicular to the rotation shaft 59, namely a horizontal plane. A detailed description will be made on the second cam plate 66 later.

First and second contact pins 67, 68 are attached to the first robot hand 21. The first and second contact pins 67, 68 are individually made of a columnar pin extending in parallel with the rotation shaft 59, for example. The first contact pin 67 is received in the cam groove 65 in the first cam plate 64. The second contact pin 68 is opposed to the edge of the second cam plate 66. The longitudinal axis of the first contact pin 67 extends in parallel with the longitudinal axis of the rotation shaft 59. The longitudinal axis of the second contact pin 68 extends in parallel with the longitudinal axis of the rotation shaft 59. Imaginary vertical planes 69, 70 define the central angle of 180 degrees around the longitudinal axis of the rotation shaft 59. The imaginary vertical plane 69 is defined to extend from the longitudinal axis of the rotation shaft 59 to the longitudinal axis of the first contact pin 67. The imaginary vertical plane 70 is likewise defined to extend from the longitudinal axis of the rotation shaft 59 to the longitudinal axis of the second contact pin 68. Specifically, the longitudinal axis of the second contact pin 68 is set to stand on a straight line extending within a horizontal plane from the longitudinal axis of the rotation shaft 59 in the direction opposite to a straight line extending within the horizontal plane from the longitudinal axis of the rotation shaft 59 to the longitudinal axis of the first contact pin 67. The first and second cam plates 64, 66 serve to interconnect the linear movement of the first robot hand 21 with the rotary movement of the first robot hand 21 as described later.

The first cam plate 64 is symmetric with respect to a predetermined vertical symmetry plane 71. The vertical symmetry plane 71 is set perpendicular to the third rails 37. When the longitudinal axis of the rotation shaft 59 is positioned within the vertical symmetry plane 71, a reference position 72 of the rotation shaft 59 is established. The longitudinal axis of the first contact pin 67 is also positioned within the vertical symmetry plane 71. The first contact pin 67 is received in a reference groove 73 defined in the cam groove 65. The longitudinal axis of the second contact pin 68 is also positioned within the vertical symmetry plane 71. The second contact pin 68 is received in a first recess 74 formed in the second cam plate 66. The first recess 74 is placed on a straight line extending within a horizontal plane from the longitudinal axis of the rotation shaft 59 in the direction opposite to a straight line extending within the horizontal plane from the longitudinal axis of the rotation shaft 59 to the reference groove 73. The first recess 74 is defined between a pair of contact surfaces 75 extending upright to a horizontal plane in an opposed relation. The contact surfaces 75 are placed on a straight line extending within a horizontal plane across the longitudinal axis of the second contact pin 68 in parallel with the third rails 37 when the longitudinal axis of the second contact pin 68 is positioned within the vertical symmetry plane 71. The first robot hand 21 is set in a reverse attitude to face the second storage box 13b.

Figure 6:
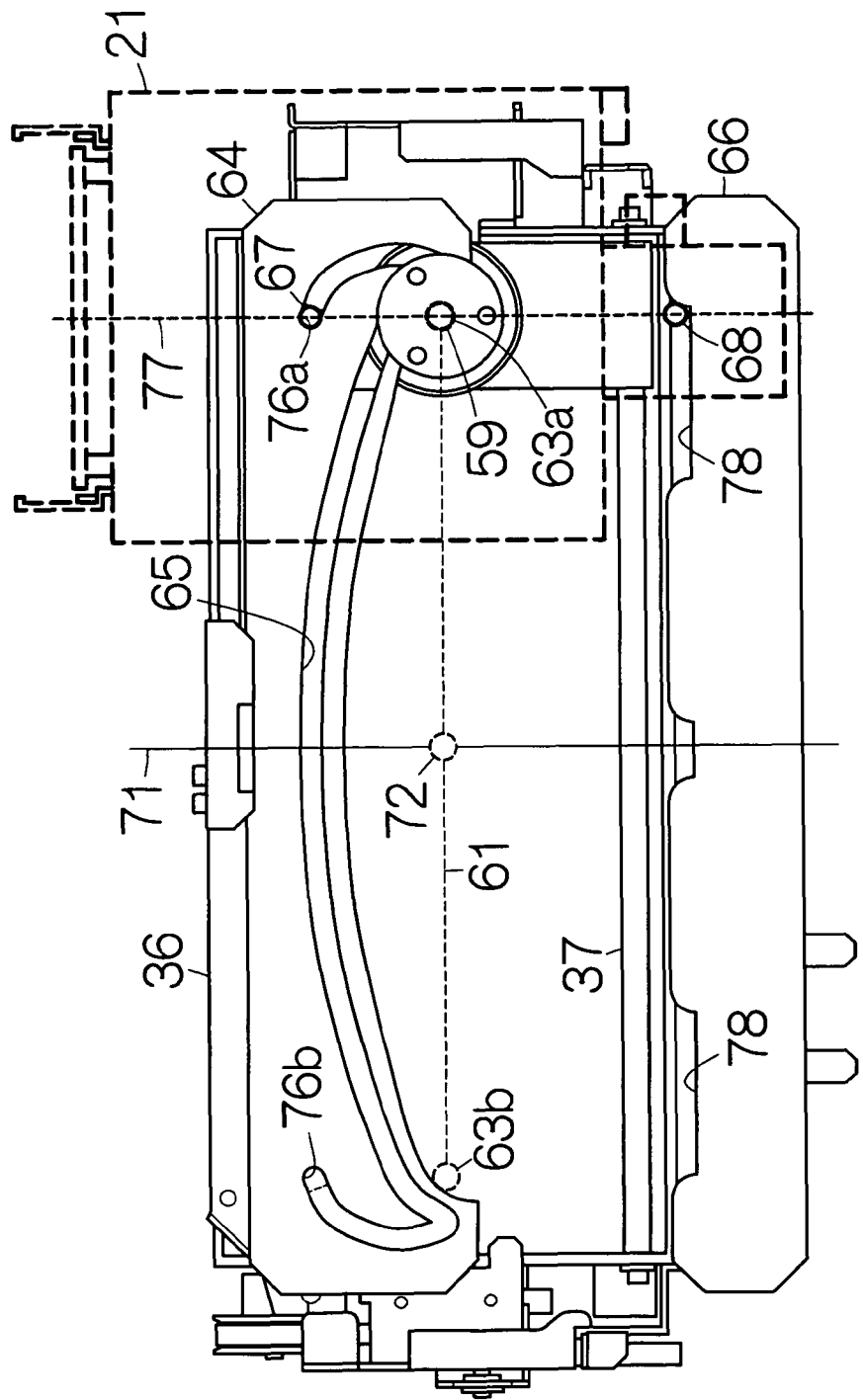
FIG. 6 is a plan view of the second rail base for schematically illustrating the terminal position of the rotation shaft.

The first terminal position 63a is set symmetric to the second terminal position 63b with respect to the vertical symmetry plane 71. In other words, the distance between the first terminal position 63a and the reference position 72 or the vertical symmetry plane 71 is set equal to the distance between the second terminal position 63b and the vertical symmetry plane 71. When the longitudinal axis of the rotation shaft 59 is positioned at the first terminal position 63a, the first contact pin 67 is received in a first terminal groove 76a, as shown in FIG. 6, for example. The longitudinal axis of the first contact pin 67 in the first terminal groove 76a and the longitudinal axis of the rotation shaft 59 are positioned within an imaginary plane 77 set perpendicular to the third rails 37. Specifically, the first terminal groove 76a receives the first contact pin 67 on a perpendicular line extending within a horizontal plane in a direction perpendicular to the straight movement path 61 when the rotation shaft 59 is positioned at the first terminal position 63a. A second terminal groove 76b is set symmetric to the first terminal groove 76a with respect to the vertical symmetry plane 71. When the rotation shaft 59 is positioned at either the first terminal position 63a or the second terminal position 63b, the first robot hand 21 is set in the reverse attitude to face the second storage box 13b. In this case, the second contact pin 68 is received in a second recess 78 formed in a second cam plate 66. The second contact pin 68 is received on the edge of the second cam plate 66 at the outer end of the second recess 78.

Figure 7:
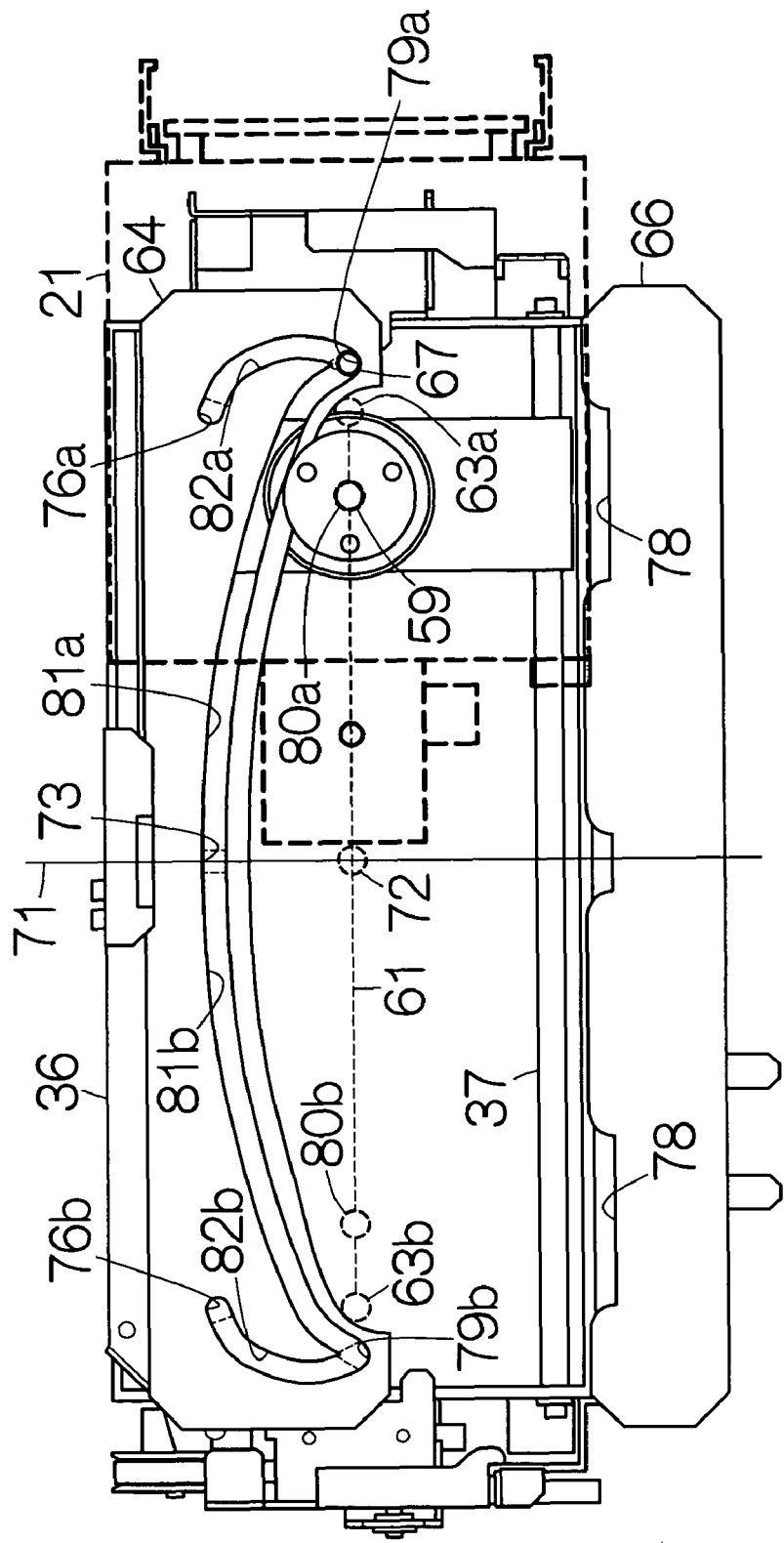
FIG. 7 is a plan view of the second rail base for schematically illustrating the standstill position of the rotation shaft.

As shown in FIG. 7, a first hooked groove 79a is defined in the cam groove 65 at a position on an extension of the straight movement path 61 outward of the first terminal position 63a. The first hooked groove 79a receives the first contact pin 67 when the rotation shaft 59 is positioned at a first standstill position 80a between the reference position 72 and the first terminal position 63a. Accordingly, when the rotation shaft 59 is positioned at the first standstill position 80a, the first robot hand 21 takes an attitude rotating around the rotation shaft 59 by the rotation angle equal to 90 degrees from the reverse attitude. The first robot hand 21 is thus set in a transverse (outward) attitude to face the first storage box 13a. A second standstill position 80b is defined between the reference position 72 and the second terminal position 63b. The second standstill position 80b is set symmetric to the first standstill position 80a with respect to the vertical symmetry plane 71. The second hooked groove 79b is likewise set symmetric to the first hooked groove 79a with respect to the vertical symmetry plane 71. The second contact pin 68 is completely separated from the second cam 66.

As is apparent from FIG. 7, the reference groove 73 and the first hooked groove 79a are connected to each other through a first guide groove 81a. The reference groove 73 and the second hooked groove 79b are connected to each other through a second guide groove 81b. The first hooked groove 79a and the first terminal groove 76a are connected to each other through a third guide groove 82a. The second hooked groove 79b and the second terminal groove 76b are connected to each other through a fourth guide groove 82b.

Figure 8:
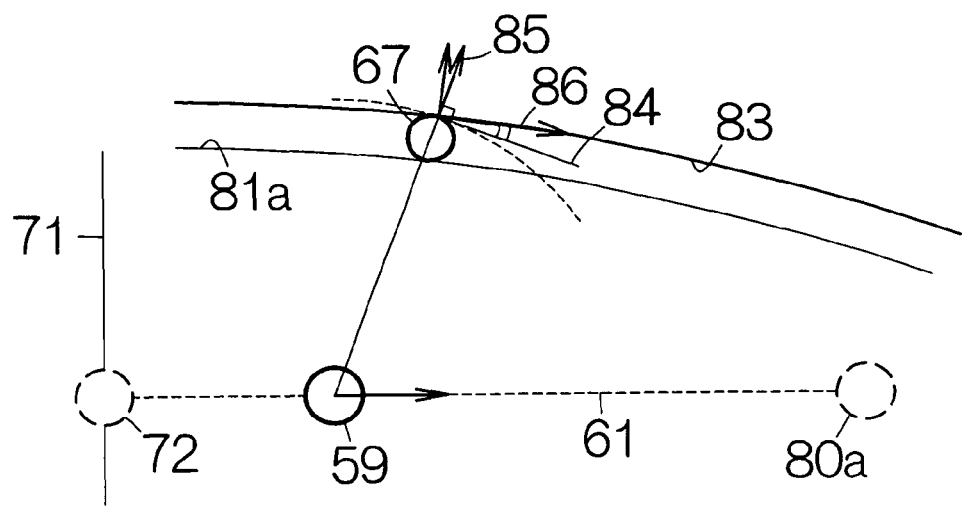
FIG. 8 is a partial enlarged plan view of the second rail base for schematically illustrating a first guide wall formed in a first guide groove.
Figure 9:
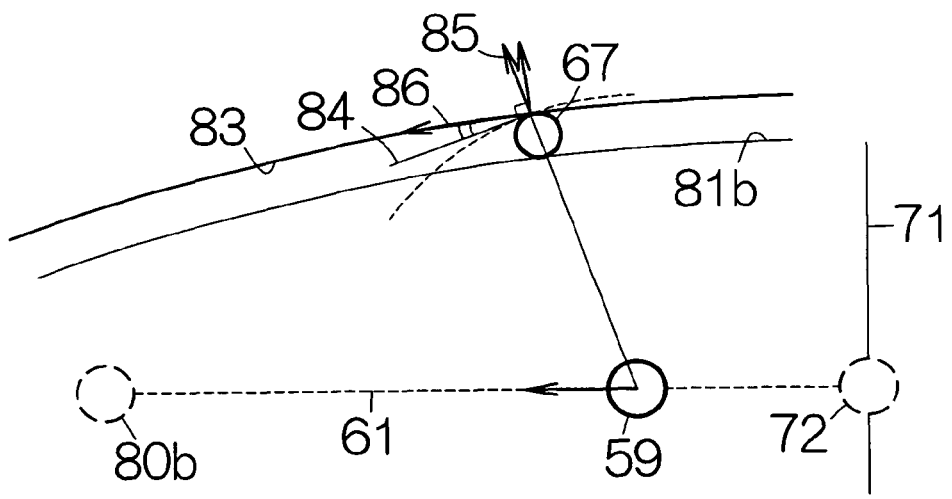
FIG. 9 is a partial enlarged plan view of the second rail base for schematically illustrating a first guide wall formed in a second guide groove.

As shown in FIG. 8, the first guide groove 81a serves to define a first guide wall 83. The first guide wall 83 stays outward of a tangent line 84 tangent to a circle, having the center at the longitudinal axis of the rotation shaft 59 and inscribing the first guide pin 67, when the rotation shaft 59 moves from the reference position 72 to the first standstill position 80a. The tangent line 84 extends from the first contact pin 67 in the direction of the advancement of the first contact pin 67. When the rotation shaft 59 moves along the straight movement path 61 from the reference position 72 to the first standstill position 80a, the first contact pin 67 receives a pushing force 85 from the rotation shaft 59 within a plane including the longitudinal axes of the rotation shaft 59 and the first contact pin 67. The pushing force 85 generates a driving force 86 for the first contact pin 67 along the first guide wall 83. The first contact pin 67 is thus allowed to move in the first guide groove 81a in response to the movement of the rotation shaft 59. Since the first contact pin 67 gradually rotates around the rotation shaft 59, the first robot hand 21 is allowed to enjoy a change in the attitude around the rotation shaft 59. The second guide groove 81b is set symmetric to the first guide groove 81a with respect to the vertical symmetry plane 71, the second guide groove 81b likewise defines the first guide wall 83, as shown in FIG. 9.

Figure 10:
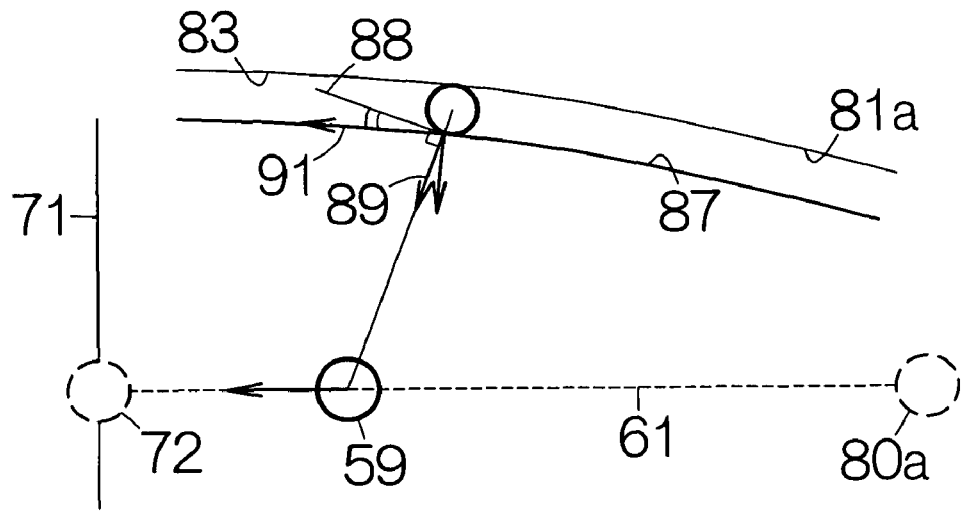
FIG. 10 is a partial enlarged plan view of the second rail base for schematically illustrating a second guide wall formed in the first guide groove.
Figure 11:
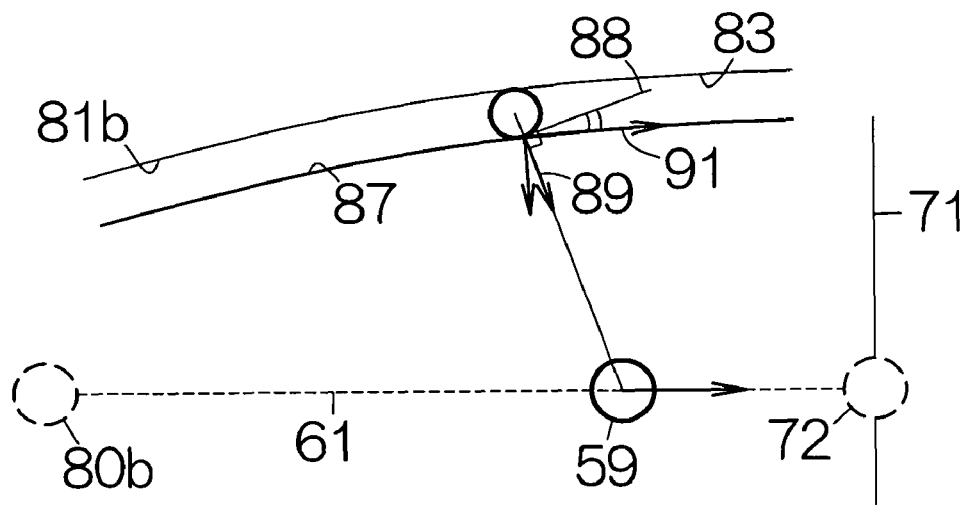
FIG. 11 is a partial enlarged plan view of the second rail base for schematically illustrating a second guide wall formed in the second guide groove.

As shown in FIG. 10, the first guide groove 81a serves to define a second guide wall 87. The second guide wall 87 stays inward of a tangent line 88 tangent to a circle, having the center at the longitudinal axis of the rotation shaft 59 and circumscribing the first contact pin 67, when the rotation shaft 59 moves from the first standstill position 80a to the reference position 72. The tangent line 88 extends from the first contact pin 67 in the direction of the advancement of the first contact pin 67. When the rotation shaft 59 moves along the straight movement path 61 from the first standstill position 80a to the reference position 72, the first contact pin 67 receives a pulling force 89 from the rotation shaft 59 within a plane including the longitudinal axes of the rotation shaft 59 and the first contact pin 67. The pulling force 85 generates a driving force 91 for the first contact pin 67 along the second guide wall 87. The first contact pin 67 is thus allowed to move in the first guide groove 81a in response to the movement of the rotation shaft 59. Since the first contact pin 67 gradually rotates around the rotation shaft 59, the first robot hand 21 is allowed to enjoy a change in the attitude around the rotation shaft 59. The second guide groove 81b is set symmetric to the first guide groove 81a with respect to the vertical symmetry plane 71, the second guide groove 81b likewise defines the second guide wall 87, as shown in FIG. 11.

Figure 12:
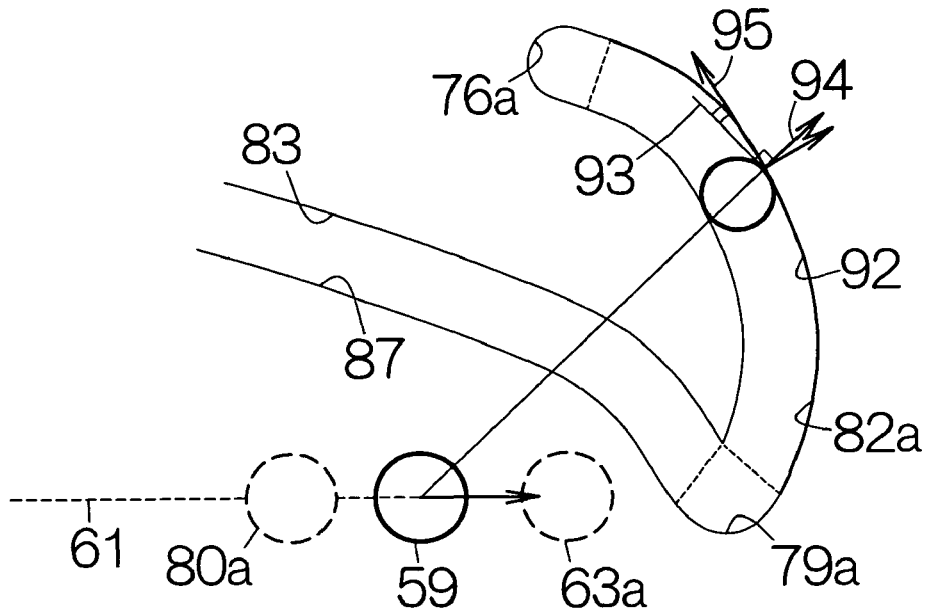
FIG. 12 is a partial enlarged plan view of the second rail base for schematically illustrating a third guide wall formed in a third guide groove.
Figure 13:
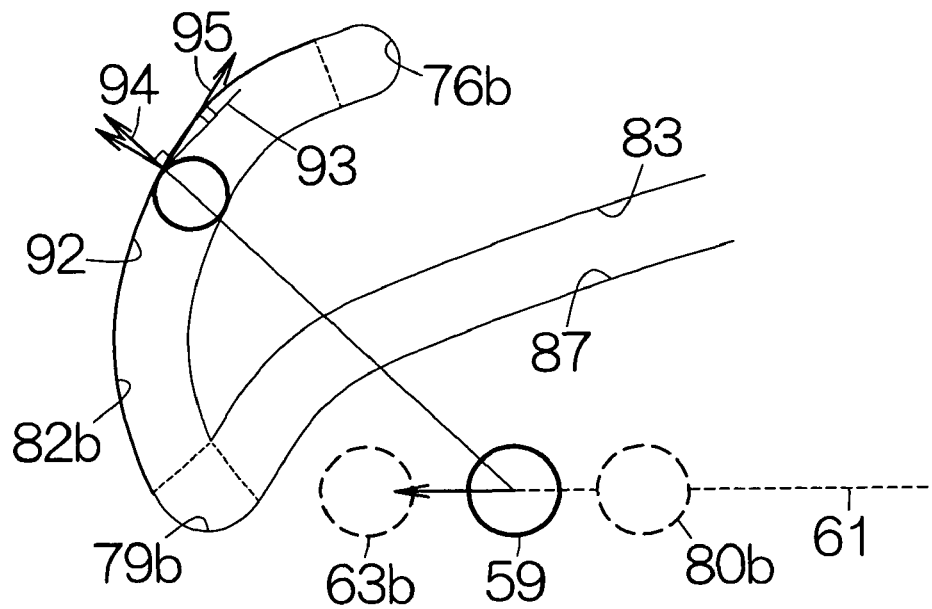
FIG. 13 is a partial enlarged plan view of the second rail base for schematically illustrating a third guide wall formed in a fourth guide groove.

As shown in FIG. 12, a third guide groove 82a serves to define the third guide wall 92. The third guide wall 92 stays outward of a tangent line 93 tangent to a circle, having the center at the longitudinal axis of the rotation shaft 59 and inscribing the first contact pin 67, when the rotation shaft 59 moves from the first standstill position 80a to the first terminal position 63a. The tangent line 93 extends from the first contact pin 67 in the direction of the advancement of the first contact pin 67. When the rotation shaft 59 moves along the straight movement path 61 from the first standstill position 80a to the first terminal position 63a, the first contact pin 67 receives a pushing force 94 from the rotation shaft 59 within a plane including the longitudinal axes of the rotation shaft 59 and the first contact pin 67. The pushing force 94 generates a driving force 95 for the first contact pin 67 along the third guide wall 92. The first contact pin 67 is thus allowed to move in the third guide groove 82a in response to the movement of the rotation shaft 59. Since the first contact pin 67 gradually rotates around the rotation shaft 59, the first robot hand 21 is allowed to enjoy a change in the attitude around the rotation shaft 59. The fourth guide groove 82b is set symmetric to the third guide groove 82a with respect to the vertical symmetry plane 71, the fourth guide groove 82b likewise defines the third guide wall 92, as shown in FIG. 13.

Figure 14:
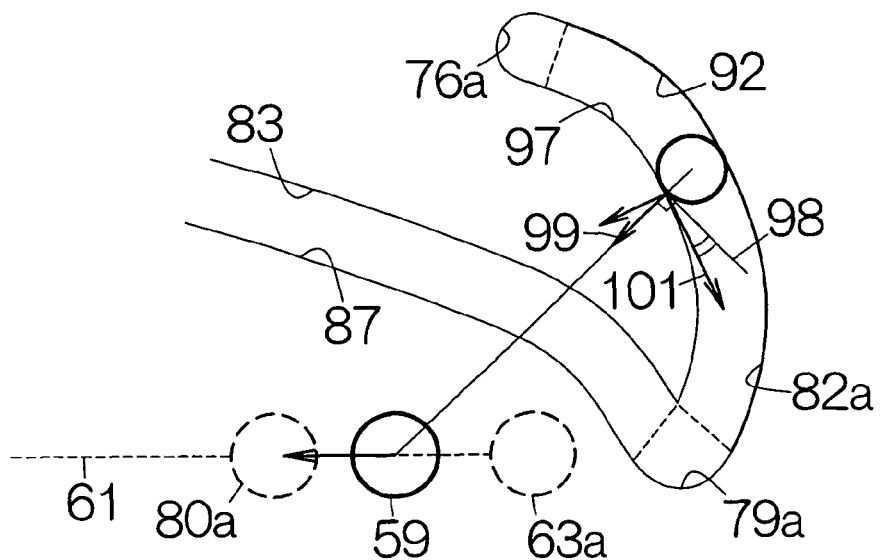
FIG. 14 is a partial enlarged plan view of the second rail base for schematically illustrating a fourth guide wall formed in the third guide groove.
Figure 15:
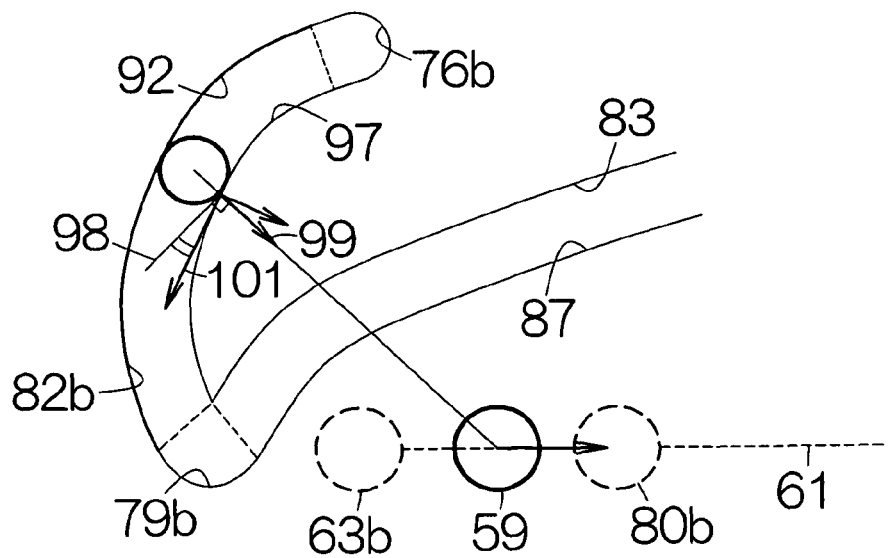
FIG. 15 is a partial enlarged plan view of the second rail base for schematically illustrating a fourth guide wall formed in the fourth guide groove.

As shown in FIG. 14, the third guide groove 82a serves to define a fourth guide wall 97. The fourth guidewall 97 stays inward of a tangent line 98 tangent to a circle, having the center at the longitudinal axis of the rotation shaft 59 and circumscribing the first contact pin 67, when the rotation shaft 59 moves from the first terminal position 63a to the first standstill position 80a. The tangent line 98 extends from the first contact pin 67 in the direction of the advancement of the first contact pin 67. When the rotation shaft 59 moves along the straight movement path 61 from the first terminal position 63a to the first standstill position 80a, the first contact pin 67 receives a pulling force 99 from the rotation shaft 59 within a plane including the longitudinal axes of the rotation shaft 59 and the first contact pin 67. The pulling force 99 generates a driving force 101 for the first contact pin 67 along the fourth guide wall 97. The first contact pin 67 is thus allowed to move in the third guide groove 82a in response to the movement of the rotation shaft 59. Since the first contact pin 67 gradually rotates around the rotation shaft 59, the first robot hand 21 is allowed to enjoy a change in the attitude around the rotation shaft 59. Since the fourth guide groove 82b is set symmetric to the third guide groove 82a with respect to the vertical symmetry plane 71, the fourth guide groove 82b likewise defines the fourth guide wall 97, as shown in FIG. 15.

Figure 16:
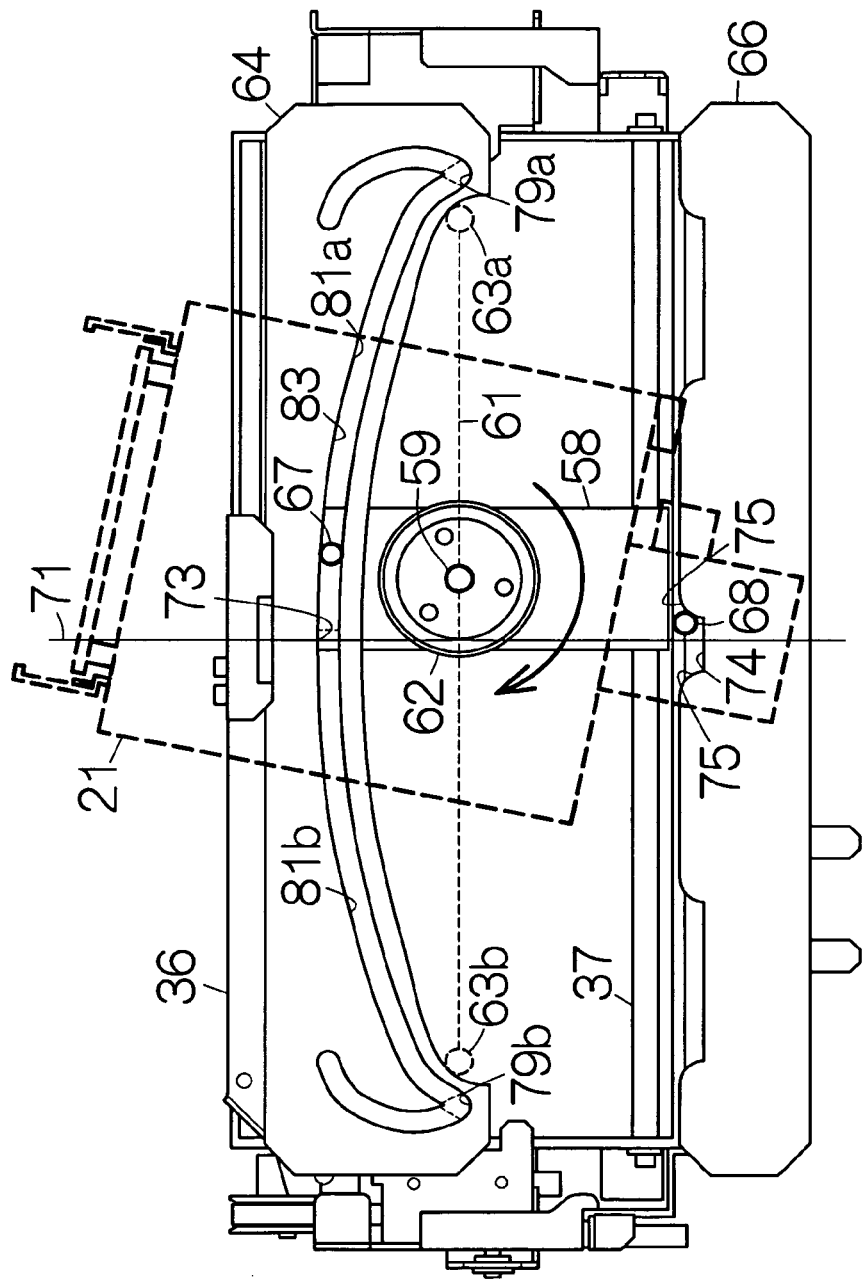
FIG. 16 is a plan view of the second rail base for schematically illustrating the first robot hand when the rotation shaft starts moving from the reference position.

Now, assume that the magnetic tape cartridge 15 is given and received between the first robot hand 21 and a specific one of the cells 14 of the first storage box 13a. When the rotation shaft 59 moves from the reference position 72 to the first standstill position 80a, for example, the second contact pin 68 is brought in contact with the edge of the second cam plate 66 within the recess 74, namely the contact surface 75, as shown in FIG. 16. The contact surface 75 receives the second contact pin 68 in parallel with the straight movement path 61. The movement of the second contact pin 68 is restrained within the first recess 74. The continued movement of the rotation shaft 59 thus serves to generate a driving force for the first robot hand 21 around the rotation shaft 59. The driving force induces an advancement of the first contact pin 67 to the first hooked groove 79a along the first guide groove 81a. The first contact pin 67 precedes an imaginary plane, including the longitudinal axis of the rotation shaft 59 and set perpendicular to the straight movement path 61, toward the first hooked groove 79a. The rotation shaft 59 thereafter serves to apply the pushing force 85 to the first contact pin 67 against the first guide wall 83 as mentioned above. The generated driving force 86 acts on the first contact pin 67 in response to the movement of the rotation shaft 59. Here, the second contact pin 68 and the contact surface 75 serve as a first driving mechanism according to the present invention.

Figure 17:
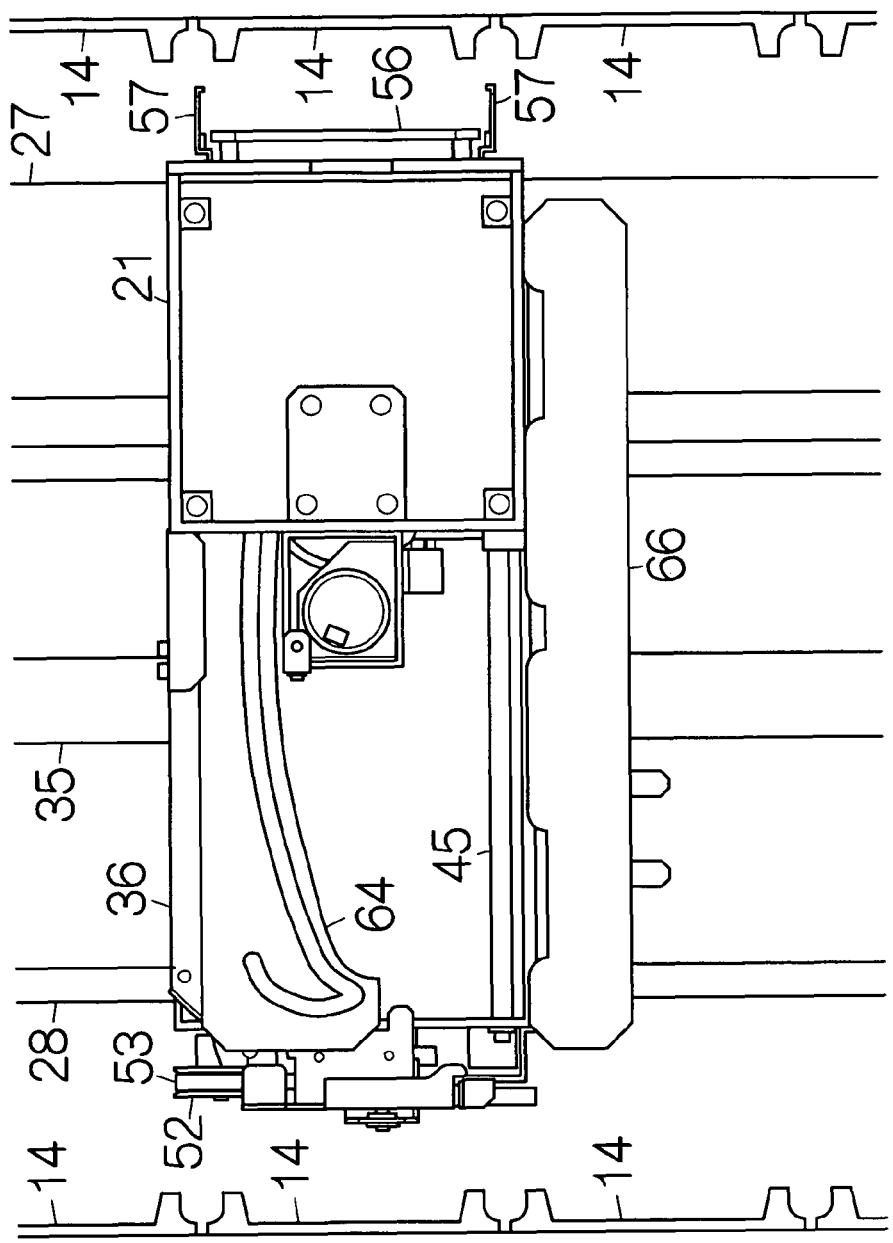
FIG. 17 is a plan view of the second rail for schematically illustrating the first robot hand opposed to a specific one of cells.

When the rotation shaft 59 reaches the first standstill position 80a, the first contact pin 67 is received in the first hooked groove 79a. The first robot hand 21 is set in a transverse (outward) attitude to face the first storage box 13a, as shown in FIG. 17. The movement of the second rail base 36 on the first rail base 28 allows the first robot hand 21 to reach a specific position in the horizontal direction relative to the first storage box 13a. The movement of the first rail base 28 along the first rail 26 allows the first robot hand 21 to reach a specific level in the vertical direction relative to the first storage box 13a. The first robot hand 21 in this manner opposes the slot 23 to the specific one of the cells 14 of the first storage box 13a. The magnetic tape cartridge 15 is given and received between the first robot hand 21 and the specific cell 14 based on the action of the grasping fingers 57.

When the rotation shaft 59 moves from the reference position 72 to the second standstill position 80b, the movement of the second contact pin 68 is restrained within the first recess 74 in the same manner as described above. The first robot hand 21 is allowed to enjoy a driving force around the rotation shaft 59 in the direction opposite to the aforementioned one. The driving force enables an advancement of the first contact pin 67 toward the second hooked groove 79b along the second guide groove 81b. The first guide wall 83 serves to generate the driving force 86 for the first contact pin 67 in response to the movement of the rotation shaft 59. When the rotation shaft 59 reaches the second standstill position 80b, the first contact pin 67 is received in the second hooked groove 79b. The first robot hand 21 is set in a transverse (outward) attitude to face the first storage box 13a. The magnetic tape cartridge 15 is given and received between the first robot hand 21 and the specific cell 14 based on the action of the grasping fingers 57. Here, the second contact pin 68 and the contact surface 75 serve as a second driving mechanism according to the present invention.

Figure 18:
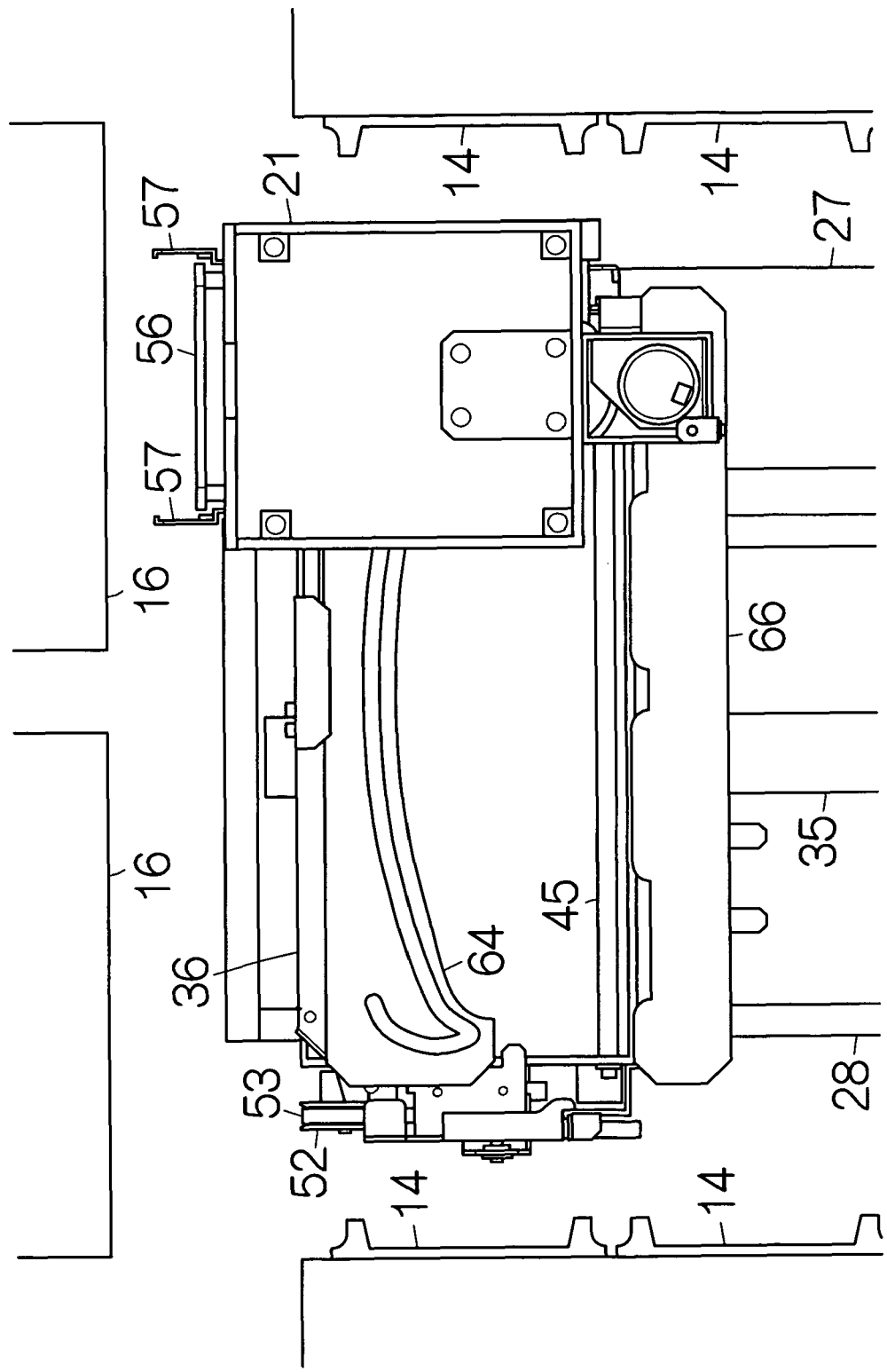
FIG. 18 is a plan view of the second rail base for schematically illustrating the first robot hand opposed to the slot of a specific one of magnetic tape drives.

Next, assume that the magnetic tape cartridge 15 is given and received between the first robot hand 21 and the magnetic tape drive 16. When the rotation shaft 59 moves from the first standstill position 80a to the first terminal position 63a, for example, the rotation shaft 59 serves to apply the pushing force 94 to the first contact pin 67 against the third guide wall 92 as mentioned above. The first contact pin 67 is allowed to receive the driving force 95 in response to the movement of the rotation shaft 59. When the rotation shaft 59 reaches the first terminal position 63a, the first contact pin 67 is received in the first terminal groove 76a. The first robot hand 21 is set in the reverse attitude to face the second storage box 13b, as shown in FIG. 18. The movement of the second rail base 36 on the first rail base 28 allows the first robot hand 21 to get closest to the second storage box 13b. The movement of the first rail base 28 along the first rail 26 allows the first robot hand 21 to reach a specific level in the vertical direction for the magnetic tape drive 16. The first robot hand 21 in this manner opposes the slot 23 to the slot of a specific one of the magnetic tape drives 16. The magnetic tape cartridge 15 is given and received between the first robot hand 21 and the magnetic tape drive 16 based on the action of the grasping fingers 57.

When the rotation shaft 59 reaches the second terminal position 63b, the first contact pin 67 is received in the second terminal groove 76b. The first robot hand 21 is set in the reverse attitude to face the second storage box 13b in the same manner as described above. The first robot hand 21 is in this manner allowed to oppose the slot 23 to the slot of a specific one of the magnetic tape drives 16. The magnetic tape cartridge 15 is given and received between the first robot hand 21 and the magnetic tape drive 16 based on the action of the grasping fingers 57.

It should be noted that the second robot hand 22 and second rail base 36 may have the structure identical to that of the aforementioned first robot hand 21 and second rail base 36.

What is claimed is:

1. A transporting mechanism for a library apparatus, comprising
   a rail;
   a rotation shaft guided on the rail for movement from a reference position to a standstill position on a straight movement path;
   a grasping mechanism unit coupled to the rotation shaft for connection to the rail for relative rotation around a longitudinal axis of the rotation shaft, the grasping mechanism unit designed to grasp an object;
   a contact piece attached to the grasping mechanism unit, the contact piece extending in parallel with the longitudinal axis of the rotation shaft;
   a cam plate extending within a plane perpendicular to the longitudinal axis of the rotation shaft, the cam plate defining a cam groove for receiving the contact piece; and
   a driving mechanism designed to drive the contact piece toward the standstill position around the rotation shaft when the rotation shaft moves from the reference position to the standstill position, wherein
   the cam groove includes:
   a reference groove receiving the contact piece on a perpendicular line set perpendicular to the straight movement path at the longitudinal axis of the rotation shaft when the rotation shaft is positioned at the reference position;
   a terminal groove receiving the contact piece on an extension of the straight movement path extending from the standstill position when the rotation shaft is positioned at the standstill position; and
   a guide groove extending from the reference groove to the terminal groove, wherein
   the guide groove includes:
   a first guide wall staying outward of a tangent line tangent to a circle, having a center at the longitudinal axis of the rotation shaft and inscribing the contact piece, when the rotation shaft moves from the reference position to the standstill position, the tangent line extending from the contact piece in a direction of advancement of the contact piece; and
   a second guide wall staying inward of a tangent line tangent to a circle, having a center at the longitudinal axis of the rotation shaft and circumscribing the contact piece, when the rotation shaft moves from the standstill position to the reference position, the tangent line extending from the contact piece in a direction of advancement of the contact piece.

2. The transporting mechanism according to claim 1, wherein the driving mechanism includes:
   an auxiliary contact piece extending in parallel with the longitudinal axis of the rotation shaft on a straight line extending from the rotation shaft in a direction opposite to a straight line extending from the rotation shaft to the contact piece; and
   an auxiliary cam plate defined on a straight line extending from the rotation shaft in a direction opposite to a straight line extending from the rotation shaft to the reference groove, the auxiliary cam plate receiving the auxiliary contact piece in parallel with the straight movement path when the rotation shaft moves from the reference position to the standstill position.

3. A transporting mechanism for a library apparatus, comprising:

a rail;

a rotation shaft guided on the rail, the rotation shaft movable on a straight movement path in opposite directions from a reference position to a first terminal position and a second terminal position;

a grasping mechanism unit coupled to the rotation shaft for connection to the rail for relative rotation around a longitudinal axis of the rotation shaft, the grasping mechanism unit designed to grasp an object;

a contact piece attached to the grasping mechanism unit, the contact piece extending in parallel with the longitudinal axis of the rotation shaft;

a cam plate extending within a plane perpendicular to the longitudinal axis of the rotation shaft, the cam plate defining a cam groove for receiving the contact piece;

a first driving mechanism designed to drive the contact piece toward the first terminal position around the rotation shaft when the rotation shaft moves from the reference position to the first terminal position; and a second driving mechanism designed to drive the contact piece toward the second terminal position around the rotation shaft when the rotation shaft moves from the reference position to the second terminal position, wherein the cam groove includes:

a reference groove receiving the contact piece on a perpendicular line set perpendicular to the straight movement path at the longitudinal axis of the rotation shaft when the rotation shaft is positioned at the reference position;

a first hooked groove receiving the contact piece on an extension of the straight movement path extending from the first terminal position when the rotation shaft is positioned at a first standstill position between the reference position and the first terminal position;

a second hooked groove receiving the contact piece on an extension of the straight movement path extending from the second terminal position when the rotation shaft is positioned at a second standstill position between the reference position and the second terminal position;

a first terminal groove receiving the contact piece on a perpendicular line set perpendicular to the straight movement path when the rotation shaft is positioned at the first terminal position;

a second terminal groove receiving the contact piece on a perpendicular line set perpendicular to the straight movement path when the rotation shaft is positioned at the second terminal position;

a first guide groove extending from the reference groove to the first hooked groove;

a second guide groove extending from the reference groove to the second hooked groove;

a third guide groove extending from the first hooked groove to the first terminal groove; and a fourth guide groove extending from the second hooked groove to the second terminal groove, wherein the first guide groove includes:

a first guide wall staying outward of a tangent line tangent to a circle, having a center at the longitudinal axis of the rotation shaft and inscribing the contact piece, when the rotation shaft moves from the reference position to the first standstill position, the tangent line extending from the contact piece in a direction of advancement of the contact piece; and a second guide wall staying inward of a tangent line tangent to a circle, having a center at the longitudinal axis of the rotation shaft and circumscribing the contact piece, when the rotation shaft moves from the first standstill position to the reference position, the tangent line extending from the contact piece in a direction of advancement of the contact piece, wherein the second guide groove includes:

a third guide wall staying outward of a tangent line tangent to a circle, having a center at the longitudinal axis of the rotation shaft and inscribing the contact piece, when the rotation shaft moves from the reference position to the second standstill position, the tangent line extending from the contact piece in a direction of advancement of the contact piece; and a fourth guide wall staying inward of a tangent line tangent to a circle, having a center at the longitudinal axis of the rotation shaft and circumscribing the contact piece, when the rotation shaft moves from the second standstill position to the reference position, the tangent line extending from the contact piece in a direction of advancement of the contact piece, wherein the third guide groove includes:

a fifth guide wall staying outward of a tangent line tangent to a circle, having a center at the longitudinal axis of the rotation shaft and inscribing the contact piece, when the rotation shaft moves from the first standstill position to the first terminal position, the tangent line extending from the contact piece in a direction of advancement of the contact piece; and a sixth guide wall staying inward of a tangent line tangent to a circle, having a center at the longitudinal axis of the rotation shaft and circumscribing the contact piece, when the rotation shaft moves from the first terminal position to the first standstill position, the tangent line extending from the contact piece in a direction of advancement of the contact piece, wherein the fourth guide groove includes:

a seventh guide wall staying outward of a tangent line tangent to a circle, having a center at the longitudinal axis of the rotation shaft and inscribing the contact piece, when the rotation shaft moves from the second standstill position to the second terminal position, the tangent line extending from the contact piece in a direction of advancement of the contact piece; and an eighth guide wall staying inward of a tangent line tangent to a circle, having a center at the longitudinal axis of the rotation shaft and circumscribing the contact piece, when the rotation shaft moves from the second terminal position to the second standstill position, the tangent line extending from the contact piece in a direction of advancement of the contact piece.

4. The transporting mechanism according to claim 3, wherein the first driving mechanism includes:

an auxiliary contact piece extending in parallel with the longitudinal axis of the rotation shaft on a straight line extending from the rotation shaft in a direction opposite to a straight line extending from the rotation shaft to the contact piece; and an auxiliary cam plate defined on a straight line extending from the rotation shaft in a direction opposite to a straight line extending from the rotation shaft to the reference groove, the auxiliary cam plate receiving the auxiliary contact piece in parallel with the straight movement path when the rotation shaft moves from the reference position to the first terminal position.

5. The transporting mechanism according to claim 3, wherein the second driving mechanism includes:
- an auxiliary contact piece extending in parallel with the longitudinal axis of the rotation shaft on a straight line extending from the rotation shaft in a direction opposite to a straight line extending from the rotation shaft to the contact piece; and
- an auxiliary cam plate defined on a straight line extending from the rotation shaft in a direction opposite to a straight line extending from the rotation shaft to the reference groove, the auxiliary cam plate receiving the auxiliary contact piece in parallel with the straight movement path when the rotation shaft moves from the reference position to the second terminal position.

6. A library apparatus comprising:
a rail;
a rotation shaft guided on the rail, the rotation shaft movable on a straight movement path in opposite directions from a reference position to a first terminal position and a second terminal position;
a grasping mechanism unit coupled to the rotation shaft for connection to the rail for relative rotation around a longitudinal axis of the rotation shaft, the grasping mechanism unit designed to grasp an object;
a contact piece attached to the grasping mechanism unit, the contact piece extending in parallel with the longitudinal axis of the rotation shaft;
a cam plate extending within a plane perpendicular to the longitudinal axis of the rotation shaft, the cam plate defining a cam groove for receiving the contact piece;
a first driving mechanism designed to drive the contact piece toward the first terminal position around the rotation shaft when the rotation shaft moves from the reference position to the first terminal position; and
a second driving mechanism designed to drive the contact piece toward the second terminal position around the rotation shaft when the rotation shaft moves from the reference position to the second terminal position, wherein the cam groove includes:
a reference groove receiving the contact piece on a perpendicular line set perpendicular to the straight movement path at the longitudinal axis of the rotation shaft when the rotation shaft is positioned at the reference position;
a first hooked groove receiving the contact piece on an extension of the straight movement path extending from the first terminal position when the rotation shaft is positioned at a first standstill position between the reference position and the first terminal position;
a second hooked groove receiving the contact piece on an extension of the straight movement path extending from the second terminal position when the rotation shaft is positioned at a second standstill position between the reference position and the second terminal position;
a first terminal groove receiving the contact piece on a perpendicular line set perpendicular to the straight movement path when the rotation shaft is positioned at the first terminal position;
a second terminal groove receiving the contact piece on a perpendicular line set perpendicular to the straight movement path when the rotation shaft is positioned at the second terminal position;
a first guide groove extending from the reference groove to the first hooked groove;
a second guide groove extending from the reference groove to the second hooked groove;
a third guide groove extending from the first hooked groove to the first terminal groove; and
a fourth guide groove extending from the second hooked groove to the second terminal groove, wherein the first guide groove includes:
a first guide wall staying outward of a tangent line tangent to a circle, having a center at the longitudinal axis of the rotation shaft and inscribing the contact piece, when the rotation shaft moves from the reference position to the first standstill position, the tangent line extending from the contact piece in a direction of advancement of the contact piece; and
a second guide wall staying inward of a tangent line tangent to a circle, having a center at the longitudinal axis of the rotation shaft and circumscribing the contact piece, when the rotation shaft moves from the first standstill position to the reference position, the tangent line extending from the contact piece in a direction of advancement of the contact piece, wherein the second guide groove includes:
a third guide wall staying outward of a tangent line tangent to a circle, having a center at the longitudinal axis of the rotation shaft and inscribing the contact piece, when the rotation shaft moves from the reference position to the second standstill position, the tangent line extending from the contact piece in a direction of advancement of the contact piece; and
a fourth guide wall staying inward of a tangent line tangent to a circle, having a center at the longitudinal axis of the rotation shaft and circumscribing the contact piece, when the rotation shaft moves from the second standstill position to the reference position, the tangent line extending from the contact piece in a direction of advancement of the contact piece, wherein the third guide groove includes:
a fifth guide wall staying outward of a tangent line tangent to a circle, having a center at the longitudinal axis of the rotation shaft and inscribing the contact piece, when the rotation shaft moves from the first standstill position to the first terminal position, the tangent line extending from the contact piece in a direction of advancement of the contact piece; and
a sixth guide wall staying inward of a tangent line tangent to a circle, having a center at the longitudinal axis of the rotation shaft and circumscribing the contact piece, when the rotation shaft moves from the first terminal position to the first standstill position, the tangent line extending from the contact piece in a direction of advancement of the contact piece, wherein the fourth guide groove includes:
a seventh guide wall staying outward of a tangent line tangent to a circle, having a center at the longitudinal axis of the rotation shaft and inscribing the contact piece, when the rotation shaft moves from the second standstill position to the second terminal position, the tangent line extending from the contact piece in a direction of advancement of the contact piece; and
an eighth guide wall staying inward of a tangent line tangent to a circle, having a center at the longitudinal axis of the rotation shaft and circumscribing the contact piece, when the rotation shaft moves from the second terminal position to the second standstill position, the tangent line extending from the contact piece in a direction of advancement of the contact piece.

7. A transporting mechanism for a library apparatus, comprising:
- a rail;
- a rotation shaft guided on the rail for movement from a reference position to a terminal position on a straight movement path;
- a grasping mechanism unit coupled to the rotation shaft for connection to the rail for relative rotation around a longitudinal axis of the rotation shaft, the grasping mechanism unit designed to grasp an object;
- a contact piece attached to the grasping mechanism unit, the contact piece extending in parallel with the longitudinal axis of the rotation shaft;
- a cam plate extending within a plane perpendicular to the longitudinal axis of the rotation shaft, the cam plate defining a cam groove for receiving the contact piece; and
- a driving mechanism designed to drive the contact piece toward the terminal position around the rotation shaft when the rotation shaft moves from the reference position to the terminal position, wherein the cam groove includes:
- a reference groove receiving the contact piece on a perpendicular line set perpendicular to the straight movement path at the longitudinal axis of the rotation shaft when the rotation shaft is positioned at the reference position;
- a hooked groove receiving the contact piece on an extension of the straight movement path extending from the terminal position when the rotation shaft is positioned at a standstill position between the reference position and the terminal position;
- a terminal groove receiving the contact piece on a perpendicular line set perpendicular to the straight movement path when the rotation shaft is positioned at the terminal position;
- a first guide groove extending from the reference groove to the hooked groove; and
- a second guide groove extending from the hooked groove to the terminal groove, wherein the first guide groove includes:
- a first guide wall staying outward of a tangent line tangent to a circle, having a center at the longitudinal axis of the rotation shaft and inscribing the contact piece, when the rotation shaft moves from the reference position to the standstill position, the tangent line extending from the contact piece in a direction of advancement of the contact piece; and
- a second guide wall staying inward of a tangent line tangent to a circle, having a center at the longitudinal axis of the rotation shaft and circumscribing the contact piece, when the rotation shaft moves from the standstill position to the reference position, the tangent line extending from the contact piece in a direction of advancement of the contact piece, wherein the second guide groove includes:
- a third guide wall staying outward of a tangent line tangent to a circle, having a center at the longitudinal axis of the rotation shaft and inscribing the contact piece, when the rotation shaft moves from the standstill position to the terminal position, the tangent line extending from the contact piece in a direction of advancement of the contact piece; and
- a fourth guide wall staying inward of a tangent line tangent to a circle, having a center at the longitudinal axis of the rotation shaft and circumscribing the contact piece, when the rotation shaft moves from the terminal position to the standstill position, the tangent line extending from the contact piece in a direction of advancement of the contact piece.

8. The transporting mechanism according to claim 7, wherein the driving mechanism includes:
- an auxiliary contact piece extending in parallel with the longitudinal axis of the rotation shaft on a straight line extending from the rotation shaft in a direction opposite to a straight line extending from the rotation shaft to the contact piece; and
- an auxiliary cam plate defined on a straight line extending from the rotation shaft in a direction opposite to a straight line extending from the rotation shaft to the reference groove, the auxiliary cam plate receiving the auxiliary contact piece in parallel with the straight movement path when the rotation shaft moves from the reference position to the terminal position.

* * * * *